(12) United States Patent
Baker et al.

(10) Patent No.: US 8,579,241 B2
(45) Date of Patent: Nov. 12, 2013

(54) FOOTWEAR CUSTOMIZATION KIT

(75) Inventors: Brian D. Baker, Portland, OR (US); Alexandre Baudouin, Portland, OR (US); William M. Dieter, Portland, OR (US)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 13/475,538

(22) Filed: May 18, 2012

(65) Prior Publication Data

US 2012/0227191 A1 Sep. 13, 2012

Related U.S. Application Data

(62) Division of application No. 13/069,460, filed on Mar. 23, 2011, now Pat. No. 8,251,207, which is a division of application No. 12/562,897, filed on Sep. 18, 2009, now Pat. No. 7,958,993.

(51) Int. Cl.
*A47G 23/02* (2006.01)

(52) U.S. Cl.
USPC ............................ 248/152; 248/95; 248/174

(58) Field of Classification Search
USPC ............................ 248/95, 152, 174; 434/397
See application file for complete search history.

(56) References Cited

U.S. PATENT DOCUMENTS

| | | | |
|---|---|---|---|
| 1,170,541 A * | 2/1916 | Jacobus | 211/50 |
| 1,822,297 A * | 9/1931 | Kemery | 211/33 |
| 2,098,735 A | 11/1937 | Yentis | |
| 2,440,393 A | 4/1948 | Clark | |
| 2,617,204 A | 11/1952 | Mann | |
| 2,648,854 A | 8/1953 | Otsuka | |
| 2,767,855 A * | 10/1956 | Brown | 211/38 |
| 3,058,237 A * | 10/1962 | King | 434/260 |
| 3,241,660 A * | 3/1966 | Cathcart, Jr. et al. | 206/780 |
| 3,407,421 A | 10/1968 | Butlin | |
| 3,535,418 A | 10/1970 | Daum et al. | |
| 3,586,279 A * | 6/1971 | Benson | 248/174 |
| 3,611,501 A | 10/1971 | Daum et al. | |
| 3,848,287 A | 11/1974 | Simonsen | |
| 4,428,089 A | 1/1984 | Dawber et al. | |
| 4,889,238 A | 12/1989 | Batchelor | |
| 4,901,390 A | 2/1990 | Daley | |
| 4,964,229 A | 10/1990 | Laberge | |

(Continued)

FOREIGN PATENT DOCUMENTS

| | | |
|---|---|---|
| CN | 200973696 | 11/2007 |
| DE | 19825615 | 7/1999 |
| KR | 20080001508 | 6/2008 |

OTHER PUBLICATIONS

"Comment agrandir des chaussures-Questions Trucs, Astuces ou Remedes de Grand-mere maison", Sep. 8, 2008. Retrieved from the Internet: http://www.trucmania.com/Questions/Vetements/Comment-agrandir-des-chaussures.html. Retrieved on Mar. 2, 2011.

(Continued)

*Primary Examiner* — Bradley Duckworth
(74) *Attorney, Agent, or Firm* — Plumsea Law Group, LLC

(57) ABSTRACT

A footwear customization kit is disclosed. The kit comprises a container including an article of footwear, a stand, a steaming bag and a set of instructions. The article of footwear includes a customizable portion that can be deformed when heated. The stand and the steaming bag can be used to heat the article of footwear in a steam environment.

19 Claims, 19 Drawing Sheets

(56) References Cited

U.S. PATENT DOCUMENTS

| | | | |
|---|---|---|---|
| 5,003,708 A | | 4/1991 | Daley |
| 5,080,237 A | * | 1/1992 | Hefner ............... 211/85.15 |
| 5,083,910 A | | 1/1992 | Abshire et al. |
| 5,123,180 A | | 6/1992 | Nannig et al. |
| 5,188,244 A | * | 2/1993 | Hollstegge ............ 211/85.15 |
| 5,516,072 A | * | 5/1996 | Shinno ................. 248/460 |
| 5,714,098 A | | 2/1998 | Potter |
| 5,733,647 A | | 3/1998 | Moore, III et al. |
| 5,746,015 A | | 5/1998 | Clement et al. |
| 5,797,862 A | | 8/1998 | Lamont |
| 5,879,725 A | | 3/1999 | Potter |
| 5,885,622 A | | 3/1999 | Daley |
| 6,026,595 A | | 2/2000 | Curry |
| 6,247,250 B1 | | 6/2001 | Hauser |
| 6,346,210 B1 | | 2/2002 | Swartz et al. |
| 6,703,142 B2 | | 3/2004 | Snow |
| 7,008,386 B2 | | 3/2006 | Alaimo et al. |
| 7,257,907 B2 | | 8/2007 | Green |
| 7,458,173 B2 | | 12/2008 | Kielt et al. |
| 7,958,993 B2 | | 6/2011 | Baker et al. |
| 2002/0050080 A1 | | 5/2002 | Vasyli |
| 2004/0031169 A1 | | 2/2004 | Jensen et al. |
| 2004/0194348 A1 | | 10/2004 | Campbell et al. |
| 2004/0194352 A1 | | 10/2004 | Campbell et al. |
| 2005/0262757 A1 | | 12/2005 | Wong et al. |
| 2006/0006079 A1 | | 1/2006 | Brooks |
| 2006/0049181 A1 | | 3/2006 | Tuhkru et al. |
| 2008/0034616 A1 | | 2/2008 | Rhenter |
| 2009/0044426 A1 | | 2/2009 | Levine |
| 2009/0119950 A1 | | 5/2009 | Kohatsu et al. |
| 2011/0068023 A1 | | 3/2011 | Baker et al. |
| 2011/0167573 A1 | | 7/2011 | Baker et al. |

OTHER PUBLICATIONS

Invitation to Pay Additional Fees and, Where Applicable, Protest Fee (with Search Report) mailed Mar. 18, 2011 in PCT Application No. PCT/US2010/049059.

The International Search Report and Written Opinion mailed May 25, 2011 in International Application No. PCT/US2010/049059.

International Preliminary Report on Patentability (including Written Opinion of the ISA) mailed Mar. 29, 2012 in International Application No. PCT/US2010/049059.

* cited by examiner

FOOTWEAR CUSTOMIZATION KIT

CROSS-REFERENCE TO RELATED APPLICATIONS

This application is a divisional of U.S. Pat. No. 8,251,207, currently U.S. application Ser. No. 13/069,460, entitled "Footwear Customization Kit", filed on Mar. 23, 2011, and issued on Aug. 28, 2012, which application is a divisional of U.S. Pat. No. 7,958,993, entitled "Footwear Customization Kit", filed on Sep. 18, 2009, and issued on Jun. 14, 2011, which applications are hereby incorporated by reference in their entirety.

BACKGROUND

The present invention relates generally to an article of footwear, and in particular to a customization kit for an article of footwear.

Tuhkru et al. (U.S. patent application publication number 2006/0049181) teaches a perfect fit system for leather shoes. Tuhkru teaches a system that uses two heating bags filled with sea salt. Tuhkru teaches microwaving the bags for several minutes and then placing the bags inside of a pair of shoes. The shoes can be placed in a heat conservation bag. The process is completed by cooling the heated shoes on the foot.

Laberge (U.S. Pat. No. 4,964,229) teaches a method and apparatus for vacuum molding multi-layer footwear. Laberge teaches multi-layer footwear formed of laminated layers of material. The layers are capable of being heating to a degree at which the footwear, when placed in a vacuum bag or compression chamber, is molded to adopt the shape of the foot inside the footwear. The footwear is heated to the point where the synthetic components of the layers of material are flexible under thermoforming conditions.

Simonsen (U.S. Pat. No. 3,848,287) teaches a method and apparatus for custom molding boots and shoes. Simonsen teaches a boot or shoe formed of a thermoplastic material. To better conform it to the wearer's foot, the wearer puts his foot within the boot and places it within a bag of a plastic material having a melting temperature higher than the molding temperature of the boot. A vacuum line is also placed within the bag and the top of the bag is sealed around the user's leg.

The related art lacks provisions for allowing a user to easily customize an article of footwear. There is a need for a design that addresses this problem of the related art.

SUMMARY

In one aspect, the invention provides a kit of parts, comprising: an article of footwear including a customizable portion, the customizable portion being customizable when heated above a predetermined temperature; a stand for holding the article of footwear in a steam environment; a steaming bag configured to cover the article of footwear and the stand in the steam environment; a set of instructions; and where the set of instructions includes information for heating the article of footwear and the customizable portion in the steam environment using the stand and the steaming bag.

In another aspect, the invention provides a kit of parts, comprising: an article of footwear including a customizable portion, the customizable portion being customizable when heated above a predetermined temperature; a stand for holding the article of footwear in a steam environment; a steaming bag configured to cover the article of footwear and the stand in the steam environment; and where the stand includes a base portion that is configured to fit inside of a steaming device.

In another aspect, the invention provides a kit of parts, comprising: an article of footwear including a customizable portion; a stand for holding the article of footwear in a steam environment; a steaming bag configured to cover the article of footwear and the stand in the steam environment; a container for storing the article of footwear, the steaming bag and the stand, the container having an open position and a closed position; and where the stand is configured to fit inside the container with the article of footwear in the closed position.

In another aspect, the invention provides a kit of parts, comprising: an article of footwear including a customizable portion, the customizable portion being customizable when heated above a predetermined temperature; the article of footwear including a throat opening having a first width; a stand for holding the article of footwear in a steam environment; the stand comprising a base portion and a footwear engaging portion; the footwear engaging portion further including a lower portion attached to the base portion and an upper portion disposed adjacent to the lower portion; a steaming bag configured to cover the article of footwear and the stand in the steam environment; and where the upper portion has a second width that is substantially less than the first width of the throat opening and wherein the lower portion has a third width that is substantially greater than the first width and wherein the upper portion can be inserted through the throat opening.

In another aspect, the invention provides a stand for holding an article of footwear in a steam environment, comprising: a base portion for supporting the stand; a footwear engaging portion oriented in at an angle with respect to the base portion; the footwear engaging portion further including a first end portion, a second end portion and an intermediate portion disposed between the first end portion and the second end portion; a detachable portion; the stand having a first position for storing the stand in a container with the article of footwear and a second position for holding the article of footwear in the steam environment; and where the detachable portion is attached to the base portion in the first position and wherein the detachable portion is attached to the intermediate portion in the second position.

In another aspect, the invention provides a stand for holding an article of footwear in a steam environment, comprising: a base portion for supporting and a footwear engaging portion; the footwear engaging portion having a folded position for storing the stand in a container with the article of footwear and a raised position for holding the article of footwear in the steam environment; and where the footwear engaging portion is substantially angled with respect to the base portion in the raised position and wherein the base portion and the footwear engaging portion have a substantially flattened configuration when the footwear engaging portion is in the folded position.

In another aspect, the invention provides a steaming bag for use with an article of footwear in a steam environment, comprising: a central portion including an interior cavity for receiving the article of footwear; a peripheral portion extending outwardly from the central portion; the central portion having a first temperature when the steaming bag is placed over an article of footwear in the steam environment and the peripheral portion having a second temperature; and where the first temperature is substantially greater than the second temperature.

In another aspect, the invention provides a steaming bag for use with an article of footwear in a steam environment, comprising: a central portion including an interior cavity for receiving the article of footwear; a first peripheral edge including a peripheral opening in fluid communication with the interior cavity, the peripheral opening extending through a substantial majority of the first peripheral edge; a second peripheral edge disposed opposite of the first peripheral edge; and where the width of the interior cavity decreases from the first peripheral edge to the second peripheral edge.

In another aspect, the invention provides An article of footwear, comprising: an upper comprising a customizable portion that is made of a first material; the article of footwear comprising a portion that is made of a second material that is different from the first material; the first material and the second material configured to be deformed when heated above a predetermined temperature; where the first material has a first rigidity after being heated above the predetermined temperature and cooled below the predetermined temperature; and where the second material has a second rigidity after being heated above the predetermined temperature and cooled below the predetermined temperature, the second rigidity being substantially different from the first rigidity.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

FIGS. 1 through 5 illustrate an embodiment of footwear customization kit 100, also referred hereafter as kit 100. Footwear customization kit 100 can be used with any type of footwear. In addition, the principles discussed throughout this detailed description may not be limited in use to footwear. Similar principles could be applied to customization kits for various different types of apparel as well.

In some embodiments, footwear customization kit 100 may used by a customer at home. For example, in some cases, a customer could purchase footwear customization kit 100 at a retail location and bring kit 100 home. In other cases, kit 100 may be shipped to an address associated with the customer. In other embodiments, footwear customization kit 100 could be used at any other location, such as a retail store or a kiosk.

Figure 1:
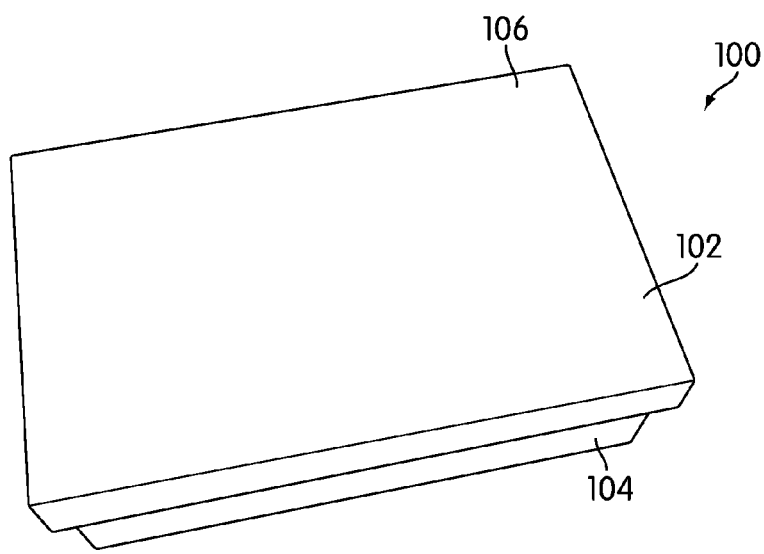
FIG. 1 is an isometric view of an embodiment of a container for a footwear customization kit.

Kit 100 may include container 102, which is shown in a closed position in FIG. 1. Container 102 can be any type of container configured to store at least one article of footwear. In some cases, container 102 may be a box. In an exemplary embodiment, container 102 may be a shoebox that is configured to store footwear. In particular, container 102 may have a generally rectangular shape and can include lower portion 104 and lid 106.

Referring to FIGS. 2 through 5, kit 100 can include various different components for customizing one or more articles of footwear. In one embodiment, kit 100 can include pair of footwear 200. Pair of footwear 200 may further comprise first article of footwear 202 and second article of footwear 204. Generally, articles of footwear associated with kit 100 can be any type of footwear. For clarity, the following detailed description discusses articles of footwear in the form of sports shoes, but it should be noted that in other embodiments any other type of footwear could be used including, but not limited to: hiking boots, soccer shoes, football shoes, sneakers, rugby shoes, basketball shoes, baseball shoes as well as other kinds of shoes. Articles of footwear associated with kit 100 may also take the form of any non-athletic shoe, including, but not limited to, dress shoes, loafers, sandals, and boots. An individual skilled in the relevant art will appreciate, therefore, that the concepts disclosed herein apply to a wide variety of footwear styles, in addition to the specific style discussed in the following material and depicted in the accompanying figures.

First article of footwear 202 and second article of footwear 204 may be oriented for a left foot and a right foot, respectively. For purposes of clarity, the following detailed description discusses first article of footwear 202, but it will be understood that each of the features discussed for first article of footwear 202 could also apply to second article of footwear 204. Furthermore, first article of footwear 202 may also be referred to as article 202 throughout the remainder of this detailed description.

Figure 4:
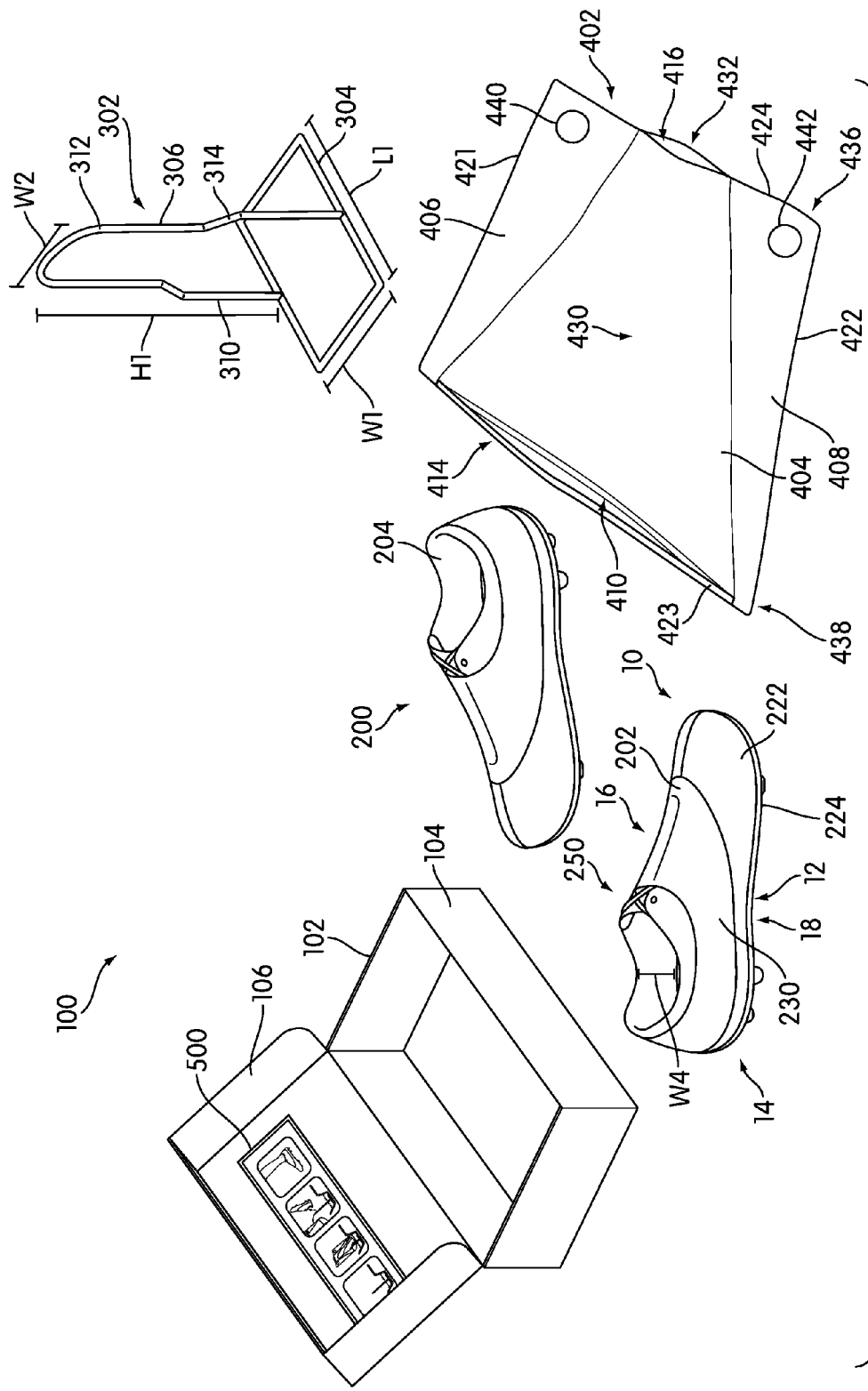
FIG. 4 is an isometric view of an embodiment of a footwear customization kit with the components outside of the container.

Referring to FIG. 4, for purposes of reference, article 202 may be divided into forefoot portion 10, midfoot portion 12 and heel portion 14. Forefoot portion 10 may be generally associated with the toes and joints connecting the metatarsals with the phalanges. Midfoot portion 12 may be generally associated with the arch of a foot. Likewise, heel portion 14 may be generally associated with the heel of a foot, including the calcaneus bone. In addition, article 202 may include lateral side 16 and medial side 18. In particular, lateral side 16 and medial side 18 may be opposing sides of article 202. Furthermore, both lateral side 16 and medial side 18 may extend through forefoot portion 10, midfoot portion 12 and heel portion 14.

It will be understood that forefoot portion 10, midfoot portion 12 and heel portion 14 are only intended for purposes of description and are not intended to demarcate precise regions of article 202. Likewise, lateral side 16 and medial side 18 are intended to represent generally two sides of an article, rather than precisely demarcating article 202 into two halves. In addition, forefoot portion 10, midfoot portion 12 and heel portion 14, as well as lateral side 16 and medial side 18, can also be applied to individual components of an article, such as a sole structure and/or an upper.

For consistency and convenience, directional adjectives are employed throughout this detailed description corresponding to the illustrated embodiments. The term "longitudinal" as used throughout this detailed description and in the claims refers to a direction extending a length or major axis of an article. In some cases, the longitudinal direction may extend from a forefoot portion to a heel portion of the article. Also, the term "lateral" as used throughout this detailed description and in the claims refers to a direction extending a width or minor axis of an article. In other words, the lateral direction may extend between a medial side and a lateral side of an article. Furthermore, the term "vertical" as used throughout this detailed description and in the claims refers to a direction generally perpendicular to a lateral and longitudinal direction. For example, in cases where an article is planted flat on a ground surface, the vertical direction may extend from the ground surface upward. In addition, the term "proximal" refers to a portion of a footwear component that is closer to a portion of a foot when an article of footwear is worn. Likewise, the term "distal" refers to a portion of a footwear component that is further from a portion of a foot when an article of footwear is worn. It will be understood that each of these directional adjectives may be applied to individual components of an article, such as an upper and/or a sole structure.

Figure 2:
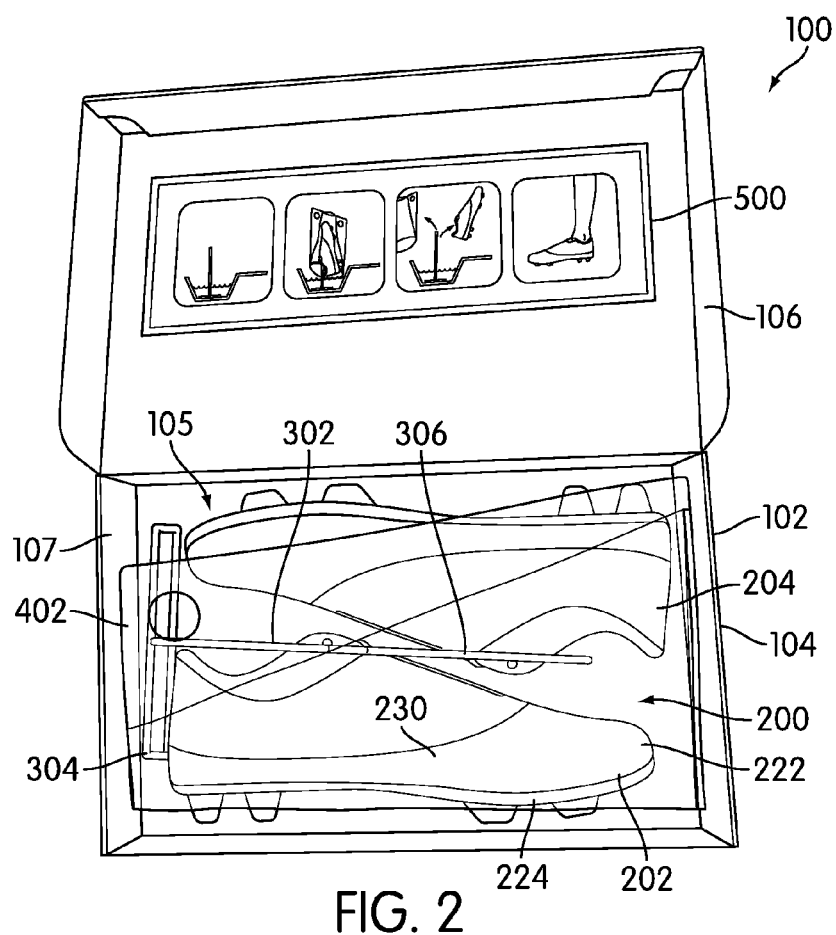
FIG. 2 is a top down view of an embodiment of a footwear customization kit.
Figure 3:
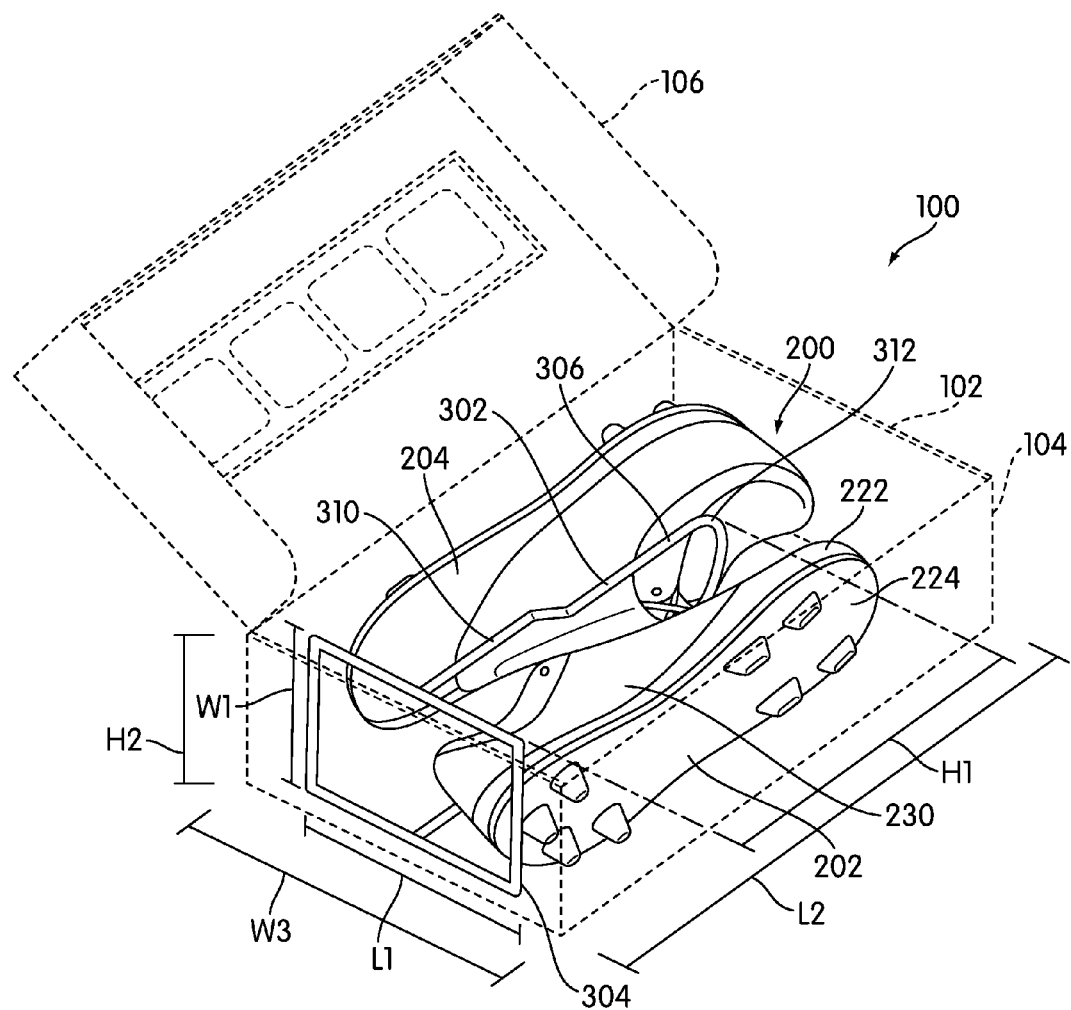
FIG. 3 is an isometric view of an embodiment of a footwear customization kit with the components packed in a container.

Referring to FIGS. 2 through 4, article 202 can include upper 222. Generally, upper 222 may be any type of upper. In particular, upper 222 may have any design, shape, size and/or color. For example, in embodiments where article 202 is a basketball shoe, upper 222 could be a high top upper that is shaped to provide high support on an ankle. In embodiments where article 202 is a running shoe, upper 222 could be a low top upper.

Article 202 can include sole structure 224. In some embodiments, sole structure 224 may be configured to provide traction for article 202. In addition to providing traction, sole structure 224 may attenuate ground reaction forces when compressed between the foot and the ground during walking, running or other ambulatory activities. The configuration of sole structure 224 may vary significantly in different embodiments to include a variety of conventional or non-conventional structures. In some cases, the configuration of sole structure 224 can be configured according to one or more types of ground surfaces on which sole structure 224 may be used. Examples of ground surfaces include, but are not limited to: natural turf, synthetic turf, dirt, as well as other surfaces.

Sole structure 224 extends between the foot and the ground when article 202 is worn. In different embodiments, sole structure 224 may include different components. For example, sole structure 224 may include an outsole, a midsole, and/or an insole. In some cases, one or more of these components may be optional.

Article 202 can be configured with one or more customizable portions. The term "customizable portion" as used throughout this detailed description and in the claims refers to a portion with characteristics that can be customized. Examples of such characteristics include, but are not limited to, size, shape, material properties (such as rigidity and/or flexibility) as well as other properties. In an exemplary embodiment, a customizable portion may a portion with a size and/or shape that can be adjusted. In addition, in some cases, the material properties of a customizable portion could also be adjusted.

The characteristics of customizable portions can be varied in different ways. In some embodiments, a customizable portion can be varied through a curing process. In other words, the customizable portion may be heated above a predetermined temperature and modified before cooling the customizable portion so that the modifications are retained. In other embodiments, the characteristics of customizable portions can be varied through the use of pressure, chemical additives or other known methods of changing the characteristics of material including the size, shape, rigidity, flexibility and/or other properties. In still other embodiments, a combination of heat, pressure and/or chemicals could be used to modify the customizable portion.

Generally, article 202 can comprise one or more customizable portions. In some embodiments, sole structure 224 may be associated with one or more customizable portions. In other embodiments, upper 222 may be associated with one or more customizable portions. In some cases, a customizable portion may be associated with forefoot portion 10, midfoot portion 12 and/or heel portion 14 of upper 222. In other cases, a customizable portion may be associated with any combination of different portions of upper 222. In an exemplary embodiment, upper 222 may include customizable portion 230. In particular, customizable portion 230 may extend through a substantial majority of upper 222. In some cases, customizable portion 230 may coincide with upper 222. Using this arrangement, upper 222 may be custom shaped to the specific geometry of the foot of a user to enhance comfort and fit.

In different embodiments, customizable portions can be made from any known materials or combination of materials. Examples of materials that may be used include, but are not limited to: any kind of thermoset polymers, thermoplastics, thermoset resins (such as epoxy, vinlyester and polyester), synthetic leathers including poromeric leathers and lorica, as well as any other kinds of materials with customizable characteristics. In an exemplary embodiment, a customizable portion may be constructed as a synthetic leather comprising two polymer layers that sandwich a canvas sheet. Moreover, a glue used to bond the polymer layers to the canvas may be configured with a relatively low melting point. When steamed, this glue can stretch or shrink to accommodate a customized shape. Although the current embodiment discusses a three-layered construction, other customizable portions could incorporate any other number of layers including a single layer construction.

In order to modify customizable portion 230, article 202 may be heated above a predetermined temperature. For example, in embodiments where a customizable portion may transition between a crystalline phase and a liquid like phase, the predetermined temperature can be a glass transition temperature. In some cases, the glass transition temperature is useful in characterizing amorphous solids such as plastics or similar materials that may not have a true melting point. However, in other cases, the predetermined temperature can be some other temperature at which a customizable portion may become substantially more deformable. In some cases, article 202 may be placed in an oven. In other cases, article 202 may be heated using steam. In an exemplary embodiment, article 202 may be heated in any steam environment. A steam environment can be created in different ways. In some cases, a steam environment can be created using a pot with water that may be boiled to create steam. In other cases, any other devices or mechanisms for creating steam can be used. By selecting materials for a customizable portion that become substantially more deformable at temperatures less than or equal to the temperature of steam, a customizable portion can be activated by applying steam to an article of footwear.

A footwear customization kit can include provisions to facilitate steaming an article of footwear for modifying one or more customizable portions. In one embodiment, footwear customization kit 100 can include stand 302 for holding article 202 above or within a steaming device. Stand 302 can include base portion 304 and footwear engaging portion 306. Base portion 304 may be configured to engage a portion of a steaming device that is used for creating a steam environment. For example, in embodiments where the steaming device is a pot, base portion 304 may engage a bottom interior surface of the pot. In some cases, footwear engaging portion 306 may extend generally perpendicularly from base portion 306.

Referring now to FIG. 4, in different embodiments, the shape of base portion 304 and/or footwear engaging portion 306 may vary. Base portion 304 may have an approximately two dimensional shape. Examples of different shapes for base portion 304 include, but are not limited to, rounded shapes, rectangular shapes, polygonal shapes, regular shapes, irregular shapes as well as any other kind of shapes. In the current embodiment, base portion 304 may have an approximately rectangular shape. In addition, footwear engaging portion 306 may have an approximately two dimensional shape that extends from base portion 304 in a perpendicular manner. Examples of different shapes for footwear engaging portion 306 include, but are not limited to any of the shapes discussed above for base portion 304. In an exemplary embodiment, footwear engaging portion 306 may have an irregular shape.

In some cases, footwear engaging portion 306 can comprise distinct portions that are associated with different portions of an article of footwear. In some embodiments, footwear engaging portion 306 may include lower portion 310 and upper portion 312. Lower portion 310 may be disposed adjacent to base portion 304. In some cases, lower portion 310 may have a substantially larger width than upper portion 312. In particular, upper portion 312 may be narrow enough to insert into a throat opening of an article. In contrast, lower portion 310 may be substantially wider than upper portion 312. In particular, lower portion 310 may be wider than the throat opening of an upper. In some cases, footwear engaging portion 306 can also include shoulder portion 314 that extends between lower portion 310 and upper portion 312. In one embodiment, the width of shoulder portion 314 may vary between lower portion 310 and upper portion 312. With this arrangement, the throat opening of an article may rest against shoulder portion 314 to help hold article 202 in place and in a generally upright position.

Stand 302 may be associated with width W1, length L1 and height H1. In particular, the dimensions of base portion 304 may be characterized width W1 and length L1. In addition, the dimensions of footwear engaging portion 306 may be characterized by height H1 and width W1. In some cases, lower portion 310 may be associated with width W1 and upper portion 312 may be associated with width W2 that substantially less than width W1.

In different embodiments, the dimensions of stand 302 can vary. In some cases, width W1 of stand 302 and width W2 of upper portion 312 can be varied in order to accommodate articles of varying sizes. In some cases, width W2 of upper portion 312 may be substantially smaller than width W4 throat opening 250 of article 202. This allows upper portion 312 to insert into forefoot portion 10 of article 202 through throat opening 250. In addition, in some cases, width W1 of lower portion 310 may be substantially larger than width W4 of throat opening 250 of article 202. This arrangement may prevent article 202 from sliding too far down footwear engaging portion 306.

In addition, in some cases, the values of width W1 and length L1 may be selected so that base 304 is large enough to maintain an article of footwear in an upright position. In other words, length L1 and width W1 may be chosen to prevent footwear engaging portion 306 and an article of footwear disposed on footwear engaging portion 306 from tipping over. Additionally, length L1 and with W1 may be selected so that base portion 304 fits within a portion of a steaming device. For example, in embodiments where the steaming device is a pot with a predetermined diameter, length L1 and width W1 may selected to fit within the diameter of the pot.

In some embodiments, stand 302 may be configured to fit within container 102. In other words, the dimensions of stand 302 may be selected to allow stand 302 to be packed within container 102. In particular, the length, width and height of stand 302 may be selected to be smaller than a first dimension, a second dimension and a third dimension of container 102. Referring to FIG. 3, container 102 includes length L2, width W3 and height H2. To fit stand 302 within container 102, stand 302 may be oriented so that footwear engaging portion 306 extends along the length of container 102. Furthermore, stand 302 may be oriented so that length L1 and width W1 of stand 302 may be oriented along the width and height of container 102, respectively. In order to ensure that stand 302 fits within container 102 when container 102 is in the closed position, the dimensions of stand 302 may be selected so that length L1 is substantially less than width W3, width W1 is substantially less than height H2 and height H1 is substantially less than length L2. Moreover, the overall shape of stand 302 allows for easy insertion of footwear engaging portion 306 between first article of footwear 202 and second article of footwear 204 within container 102.

In the current embodiment, stand 302 may be configured as a wired frame. In other embodiments, however, stand 302 could be configured in any other manner. Further examples of different configurations for stand 302 are discussed later in this detailed description.

Referring back to FIG. 4, kit 100 can include steaming bag 402. In some embodiments, steaming bag 402 may comprise first peripheral edge 421, second peripheral edge 422, third peripheral edge 423 and fourth peripheral edge 424. Furthermore, steaming bag 402 may comprise central portion 404 that includes interior cavity 410. In some cases, steaming bag 402 may further comprise first peripheral portion 406 and second peripheral portion 408 that extend from central portion 404 to first peripheral edge 421 and second peripheral edge 422, respectively. First peripheral portion 406 and second peripheral portion 408 may include first end portions 436 disposed adjacent to fourth peripheral edge 424 and second end portions 438 disposed adjacent to third peripheral edge 426. In addition, third peripheral edge 423 may include peripheral opening 414 that provides access to interior cavity 410 of central portion 404. In some, but not all embodiments, fourth peripheral edge 424 may include vent 416 that provides a secondary access for central portion 404. In other words, vent 416 is an optional opening and may not be included in all embodiments.

In some embodiments, the shapes of first peripheral portion 406 and second peripheral portion 408 may vary. In some cases, first peripheral portion 406 and second peripheral portion 408 may be substantially rectangular portions or strip like portions with constant widths. In other cases, first peripheral portion 406 and second peripheral portion 408 may have variable widths. In an exemplary embodiment, for example, first end portions 436 of first peripheral portion 406 and second peripheral portion 408 may be substantially wider than second end portions 438 of first peripheral portion 406 and second peripheral portion 408. In other words, first peripheral portion 406 and second peripheral portion 408 are much larger at first end portions 436 than at second end portions 438. Moreover, this arrangement may provide central portion with a width that tapers from the widest point at third peripheral edge 423 to the narrowest point at fourth peripheral edge 424.

Steaming bag 402 may comprise a substantially elastic material that can be expanded and collapsed when filled with fluids or solid materials. In a first position, steaming bag 402 may have a substantially flat or planar geometry. Furthermore, steaming bag 402 may obtain a three dimensional geometry when filled with a solid object or fluid.

The two dimensional shape corresponding to the first position of steaming bag 402 can vary in different embodiments. In some cases, steaming bag 402 may have a substantially rectangular shape. In other cases, steaming bag 402 may have an approximately trapezoidal shape. Examples of other shapes for steaming bag 402 include, but are not limited to rounded shapes, triangular shapes, polygonal shapes, regular shapes, irregular shapes as well as any other kinds of shapes. In an exemplary embodiment, steaming bag 402 has an approximately trapezoidal shape.

In a second, or expanded, position of steaming bag 402, first side 430 and second side 432 (which is disposed opposite of first side 430) of steaming bag 402 may be separated at central portion 404. In other words, central interior cavity 410 may expand outwardly. In some cases, central portion 404 may have an approximately conical shape when expanded. In contrast to central portion 404, first peripheral portion 406 and second peripheral portion 408 may retain a substantially flattened geometry in this second position. In particular, first side 430 and second side 432 may not separate at first peripheral portion 406 and second peripheral portion 408. Instead, first side 430 and second side 434 may be fixedly attaché to one another at first peripheral portion 406 and second peripheral portion 408. This arrangement allows first peripheral portion 406 and second peripheral portion 408 to be used as handles for steaming bag 402. In particular, first peripheral portion 406 and second peripheral portion 408 may retain substantially flattened geometries that may be easier to grasp than central portion 404.

The arrangement discussed here can also provide differing thermal properties for various portions of steaming bag 402. In some cases, first peripheral portion 406 and second peripheral portion 408 may have lower temperatures in a steam environment than central portion 404. This may occur as central portion 404 is filled with steam and thereby heated to a greater temperature than first peripheral portion 406 and second peripheral portion 408 which are not filled with steam.

In some embodiments, steaming bag 402 can include additional provisions for facilitating ease of use. In some cases, steaming bag 402 can include one or more holes that are easily grasped by a user. In an exemplary embodiment, steaming bag 402 can include first grasping hole 440 and second grasping hole 442 that are disposed on first peripheral portion 406 and second peripheral portion 408, respectively. In some cases, first grasping hole 440 and second grasping hole 442 may be disposed adjacent to fourth peripheral edge 424.

As seen in the Figures, container 102 comprises a convenient way of storing each of the components of kit 100. In some cases, each of the components discussed above can be packed into container 102 in the manner illustrated in FIG. 2. In particular, first article of footwear 202 and second article of footwear 204 can be placed into interior compartment 105 of container 102. Next, stand 302 can be placed with base portion 304 along first sidewall 107 of container 102. Additionally, footwear engaging portion 306 can be placed or inserted between first article of footwear 202 and second article of footwear 204. Finally, steaming bag 402 can be placed in a flattened position over first article of footwear 202, second article of footwear 204 and stand 302. With this arrangement, each of the components of kit 100 may be easily stored within container 102.

A footwear customization kit may include provisions for instructing a user about how to customize an article of footwear. In the current embodiment, kit 100 can include set of instructions 500. Generally, set of instructions 500 can be supplied in any format. In some cases, set of instructions 500 may be a printed copy of instructions. For example, in one embodiment, set of instructions 500 could be provided as a booklet that is packed within container 102. In other cases, set of instructions 500 may be associated with a digital storage device. Examples of digital storage devices include, but are not limited to CD's, flash drives, memory disks as well as other types of digital storage devices. In an exemplary embodiment, set of instructions 500 may be given as a set of printed directions. Although the current embodiment illustrates set of instructions 500 as being located on interior surface 502 of lid 106, in other embodiments, set of instructions 500 could be disposed on another portion of container 102. Furthermore, in some cases, set of instructions 500 could be printed in a separate sheet and stored within container 102 rather than being affixed to a portion of container 102. In some embodiments, the instructions may be placed on portions of the device itself, for example, the instructions may be placed on steaming bag 402. In other embodiments, a notice may be placed on the device itself, for example, steaming bag 402, which informs the user to read and follow the instructions. It is possible to provide the instructions in more than one location, for example, set of instructions 500 may be both located on lid 106 and provided as a booklet packed in container 102.

Figure 5:
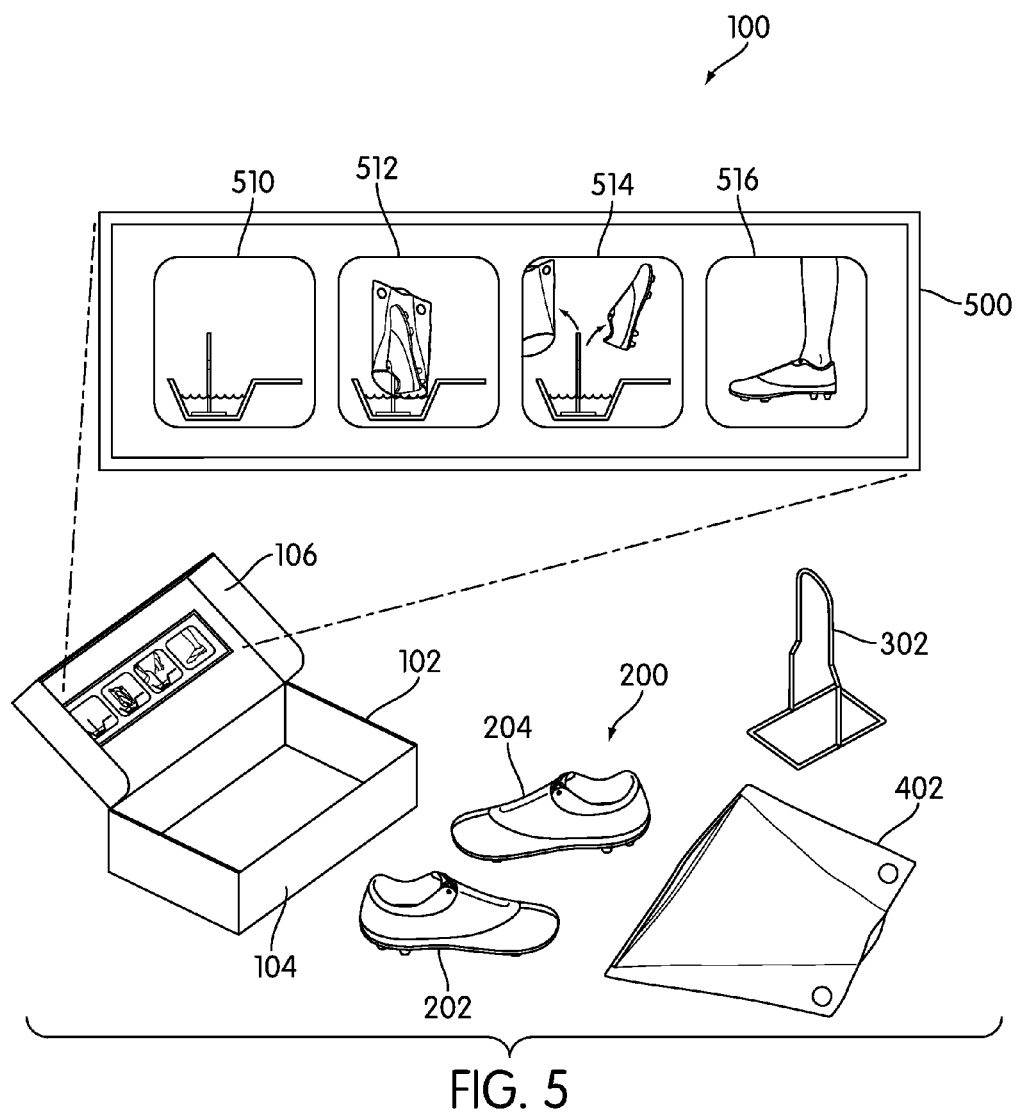
FIG. 5 is an isometric enlarged view of an embodiment of a set of instructions associated with a footwear customization kit.

Referring now to FIG. 5, set of instructions 500 may schematically illustrate the steps for customizing an article of footwear. In the current embodiment, set of instructions 500 illustrates four steps for customizing an article of footwear. First panel 510 schematically illustrates the first step, in which a stand is placed in a pot of water. Next, as illustrated in second panel 512, an article may be placed onto the stand and a steaming bag may then be placed over both the stand and the article of footwear. At this point, the water may be boiled and steam may be applied to the article of footwear including the customizable portion. Next, as illustrated in third panel 514, the bag may be removed from the article of footwear and the article may be removed from the stand. Finally, as illustrated in fourth panel 516, a user may insert a foot into the article of footwear. At this point, the customizable portion may conform to the shape of the foot as the article of footwear cools.

In some cases, set of instructions 500 can include pictures. In other cases, set of instructions 500 can include written instructions. In other cases, set of instructions 500 can include a combination of pictures and written instructions. Moreover, it will be understood that the instructions discussed and shown in FIG. 5 are only intended to be illustrative and in other embodiments additional steps can be removed or added.

FIGS. 6 through 11 illustrate an exemplary embodiment of a method of customizing article 202 using the components of kit 100. For purposes of clarity, the method is only illustrated using article 202, however it will be understood that similar steps may be repeated to customize second article of footwear 204.

Figure 6:
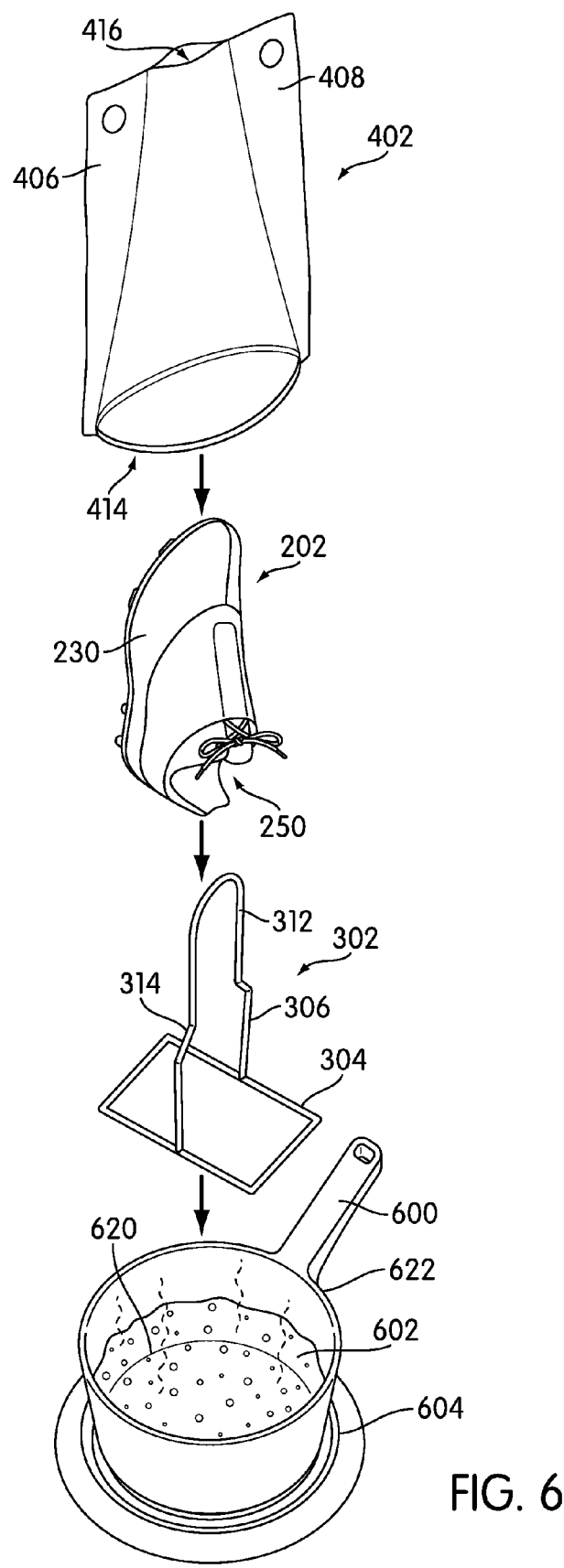
FIG. 6 is an exploded isometric view of an embodiment of the components of a footwear customization kit being positioned in a steam environment.
Figure 7:
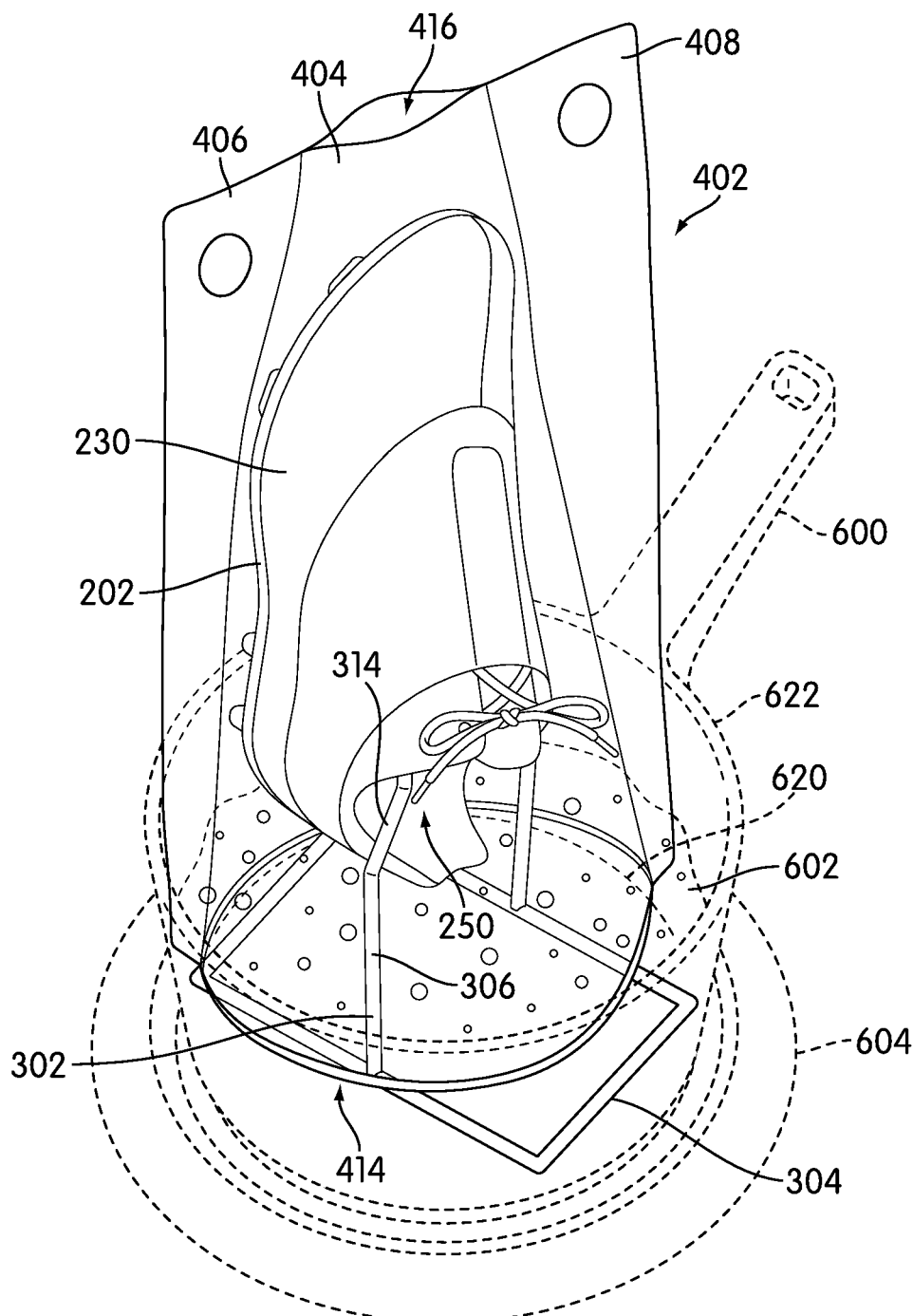
FIG. 7 is an isometric view of an embodiment of the components of a footwear customization kit positioned within a steam environment.

Referring to FIGS. 6 and 7, stand 302, article 202 and steaming bag 402 may be associated with a steam environment. In the current embodiment, the steam environment comprises pot 600, which is filled with water 602 and further placed on burner 604. Generally, any kind of pot may be used. In some cases, a user may select a pot that is large enough to accommodate the components of kit 100. In addition, in other embodiments a user may not use a pot. Instead, a user could use any container that is capable of containing boiling water. Furthermore, in still other embodiments other types of steaming devices could be used for producing a steam environment.

As water 602 is boiled, steam can be produced for heating article 202 and specifically customizable portion 230. The components shown here can be assembled in any order. In the exemplary embodiment, stand 302 may be first placed within pot 600 and then article 202 can be placed on stand 302. As previously discussed, upper portion 312 of stand 302 may be inserted into throat opening 250 of article 202. As seen in FIG. 7, the increased width of shoulder portion 314 may help prevent article 202 from sliding all the way down footwear engaging portion 306 of stand 302.

Following this, steaming bag 402 may be placed over article 202 and portions of stand 302. As previously discussed, base portion 304 of stand 302 is configured to rest against interior lower surface 620 of pot 600. In the current embodiment, peripheral opening 414 may be placed within pot 600 towards interior lower surface 620. In an exemplary embodiment, peripheral opening 414 may cover a substantial majority of the surface area of water 602 in order to collect a majority of the steam coming from water 602. In some other embodiments, first peripheral opening 414 of steaming bag 402 can be configured to engage outer periphery 622 of pot 600 so that no steam escapes around steaming bag 402.

In some embodiments, base portion 304 of stand 302 may be disposed within water 602. In some cases, therefore, it is desirable that base portion 304 comprise a material that will withstand the high temperatures of water 602. In some cases, base portion 304 may be capable of being heated above the boiling point of water.

It is desirable that the components are assembled within pot 600 prior to water 602 boiling. Therefore, once the components of kit 100 are assembled within pot 600, a user may turn on burner 604 to heat water 602 and create a steam environment for article 202.

Figure 8:
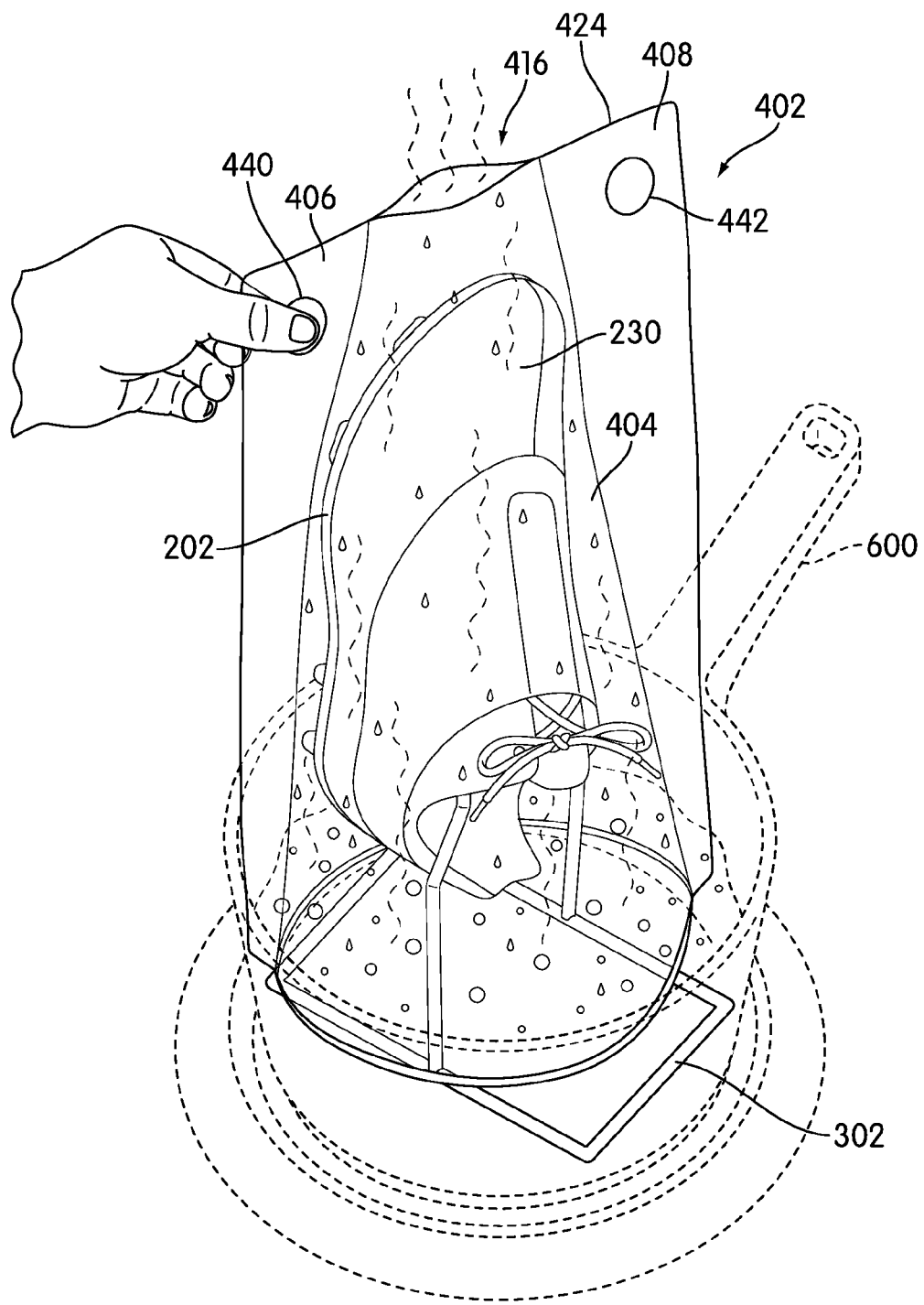
FIG. 8 is an isometric view of an embodiment of a steaming bag being removed from an article of footwear.

Referring now to FIG. 8, steam may be collected within steaming bag 402 in order to heat customizable portion 230. In some embodiments, steam may be applied for a predetermined amount of time. For example, in one embodiment set of instructions 500 (see FIG. 5) can include information about the amount of time that article 202 should be steamed. In some cases, a user could use a timer to keep track of the length of time that article 202 is exposed to steam. In other embodiments, a user may take temperature measurements inside of steaming bag 402 to determine if customizable portion 230 has been heated above a predetermined temperature. For example, in one embodiment set of instructions 500 can include information about the predetermined temperature so that a user can determine when an article has been heated to a temperature that is above the predetermined temperature. In still other embodiments, a combination of timing methods and temperature measuring methods could be used to determine when an article has been heated above a predetermined temperature.

In some cases, vent 416 may be provided to release steam from steaming bag 402. In other cases, however, no vent may be provided on fourth peripheral edge 424. In still other cases, other vents or holes could be provided at different locations on steaming bag 402.

After a predetermined period of time, steaming bag 402 may be removed from article 202 and stand 302. In some cases, a user can grasp first peripheral portion 406 and/or second peripheral portion 408 to avoid grasping central portion 404 directly. With central portion 404 filled with steam, first peripheral portion 406 and second peripheral portion 408 may have substantially lower temperatures than central portion 404. In addition, in some cases, a user may place his or her fingers through first grasping hole 440 and/or second grasping hole 442. This configuration allows a user to remove steaming bag 402 easily in a safe and effective manner.

Figure 9:
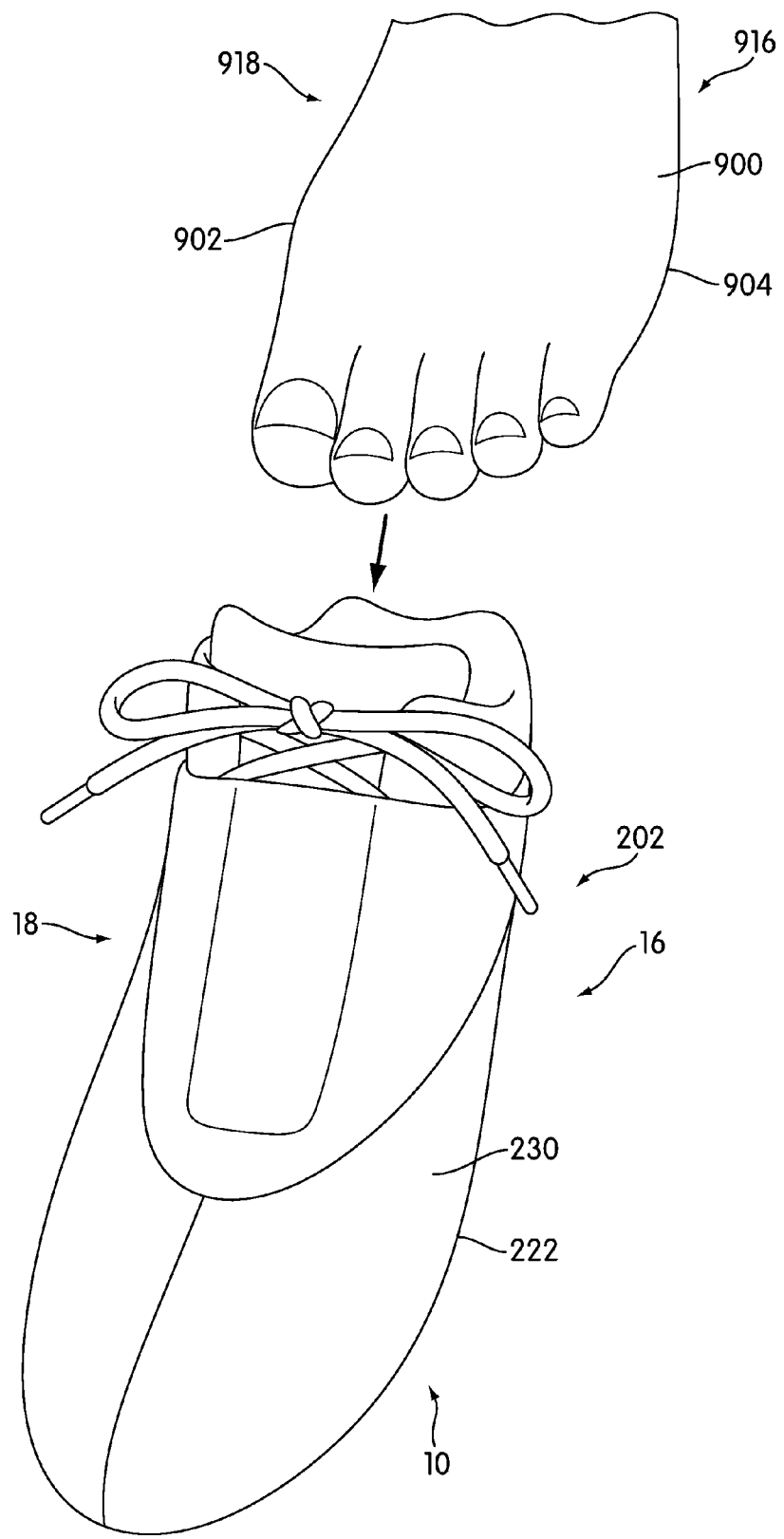
FIG. 9 is an isometric view of an embodiment of an article of footwear in a heated condition and a foot preparing to insert into the article of footwear.
Figure 10:
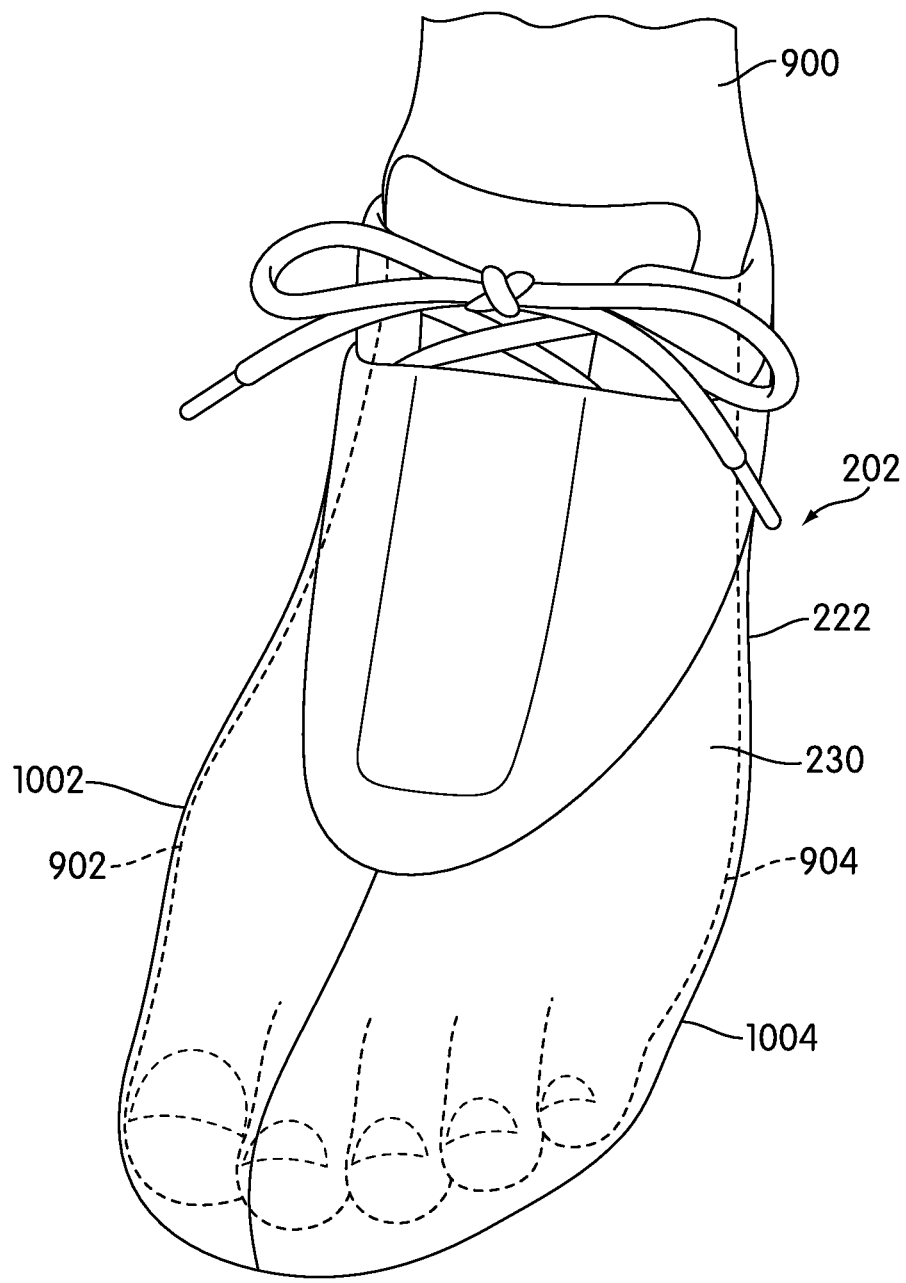
FIG. 10 is an isometric view of an embodiment of an article of footwear with a customizable portion conforming to the contours of a foot.
Figure 11:
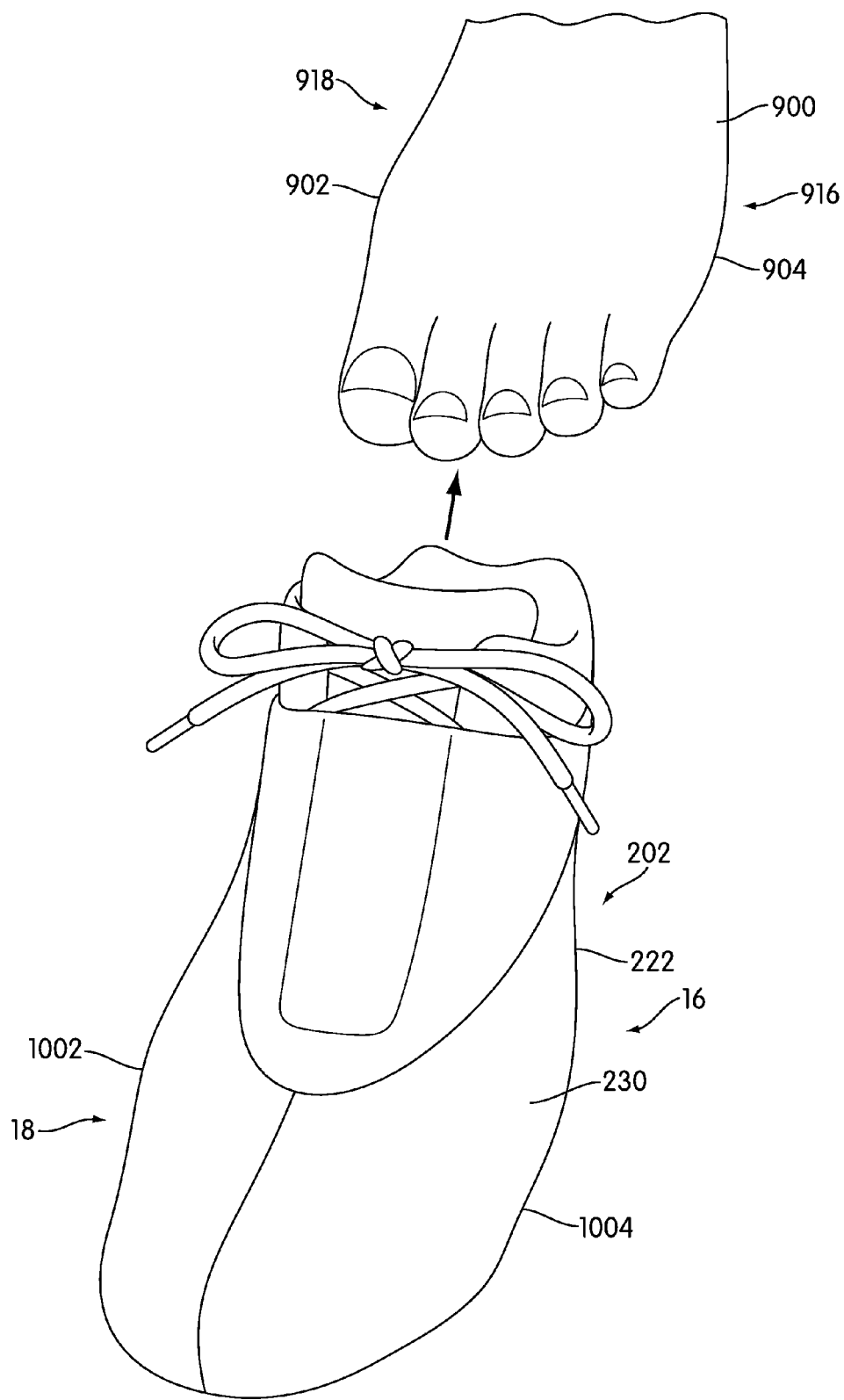
FIG. 11 is an isometric view of an embodiment of an article of footwear with a customizable portion retaining a customized geometry after a foot has been removed.

FIGS. 9 through 11 illustrate isometric views of an embodiment of a customizable portion of an article conforming to the shape of a foot. As previously discussed, the current embodiment includes customizable portion 230 that comprises a substantial majority of upper 222 of article 202. Therefore, as a foot is inserted into upper 222, a substantial majority of upper 222 may conform to the shape of the foot.

Referring to FIG. 9, the temperature of article 202 may be above the predetermined temperature at which customizable portion 230 softens substantially. In this heated state, customizable portion 230 may be partially deformable. Initially, customizable portion 230 has a substantially smooth shape. In particular, forefoot portion 10 is generally smooth on both lateral side 16 and medial side 18 of upper 222.

Foot 900 is illustrated as inserting into article 202. In contrast to the substantially smooth shape of customizable portion 230, foot 900 has a substantially irregular shape. In this case, foot 900 includes first protrusion 902 and second protrusion 904 associated with medial side 918 and lateral side 916, respectively, of foot 900. These protrusions could be associated with any type of irregularities in the shape of foot 900 including any kinds of bony protrusions, calluses or other types of protrusions.

Referring now to FIG. 10, foot 900 has been fully inserted into upper 222. Furthermore, the temperature of article 202 is still above the predetermined temperature associated with customizable portion 230. In this heated state, customizable portion 230 may be deformed. In an exemplary embodiment, customizable portion 230 may deform so as to adapt to the shape of foot 900. Customizable portion 230 may be reshaped due the pressure applied by foot 900. For example, first contoured portion 1002 of customizable portion 230 may be formed from the local pressure applied by first protrusion 902. In other words, first contoured portion 1002 may be configured with a substantially similar geometry to first protrusion 902. In particular, first contoured portion 1002 may form a protrusion on upper 222 that corresponds to first protrusion 902 on foot 900. In a similar manner, second contoured portion 1004 of customizable portion 230 may be formed from the local pressure applied by second protrusion 904. In other words, second contoured portion 1004 may be configured with a substantially similar geometry to second protrusion 904. In particular, second contoured portion 1004 may form a protrusion on upper 222 that corresponds to second protrusion 904 on foot 900.

It should be understood that a customizable portion could adapt to any geometric features of a foot. In some cases, the customizable portion may adapt to protrusions of various kinds. Additionally a customizable portion can adapt to the overall shape and geometry of a foot. For example, in an embodiment where a user has relatively wide arch, a customizable portion comprising a portion of the upper may be configured to expand at the arch to provide a better fit for the user. In other words, a customizable portion can be deformed to accommodate global geometric features of a foot in addition to local geometric features such as protrusions.

In order to ensure that customizable portion 230 is substantially permanently deformed in a manner that corresponds to foot 900, it is desirable that article 202 cool below the predetermined temperature before removing foot 900. In some cases, a user could make a temperature measurement of article 202. In other cases, a user may wait a predetermined period of time before removing article 202 to ensure that article 202 has sufficiently cooled. In some embodiments, a set of instructions could provide information for a user including a desired amount of time for keeping a foot inserted inside an article of footwear.

After article 202 has cooled below the predetermined temperature, foot 900 can be removed from upper 222, as illustrated in FIG. 11. Customizable portion 230 may substantially retain the shape corresponding to foot 900 following the removal of foot 900. In this case, customizable portion 230 retains first contoured portion 1002 and second contoured portion 1004 even after foot 900 as been removed. With this arrangement, upper 222 may be substantially permanently reshaped to provide a better fit and enhanced comfort for the user.

In some embodiments, the process of reshaping a customizable portion may only occur once over the lifetime of an article. In some cases, for example, a customizable portion may be made of a material that can only be cured a single time. In other words, the cycle of heating the customizable portion above a predetermined temperature, deforming the customizable portion and then cooling the customizable portion below the predetermined temperature can only occur once. Such materials may not return to a substantially deformable state after being reheated above the predetermined temperature. In other embodiments, however, the process of reshaping a customizable portion could occur two or more times over the lifetime of an article.

Figure 12:
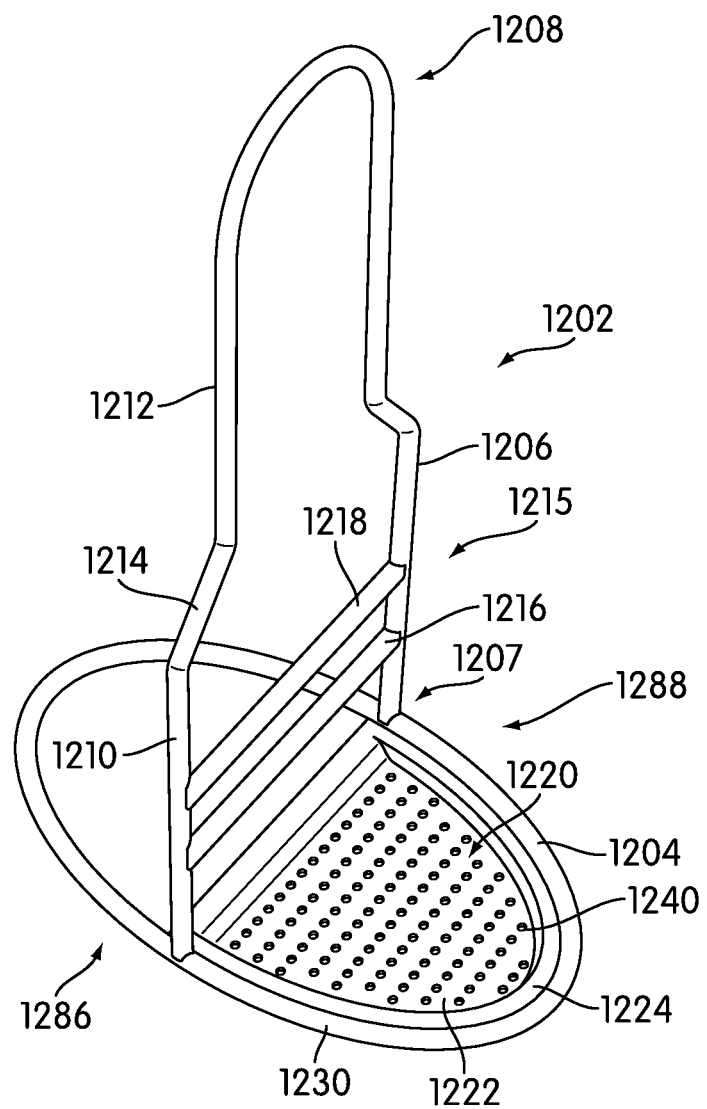
FIG. 12 is an isometric view of an embodiment of a stand for a footwear customization system including a detachable portion attached to a base portion of the stand.
Figure 13:
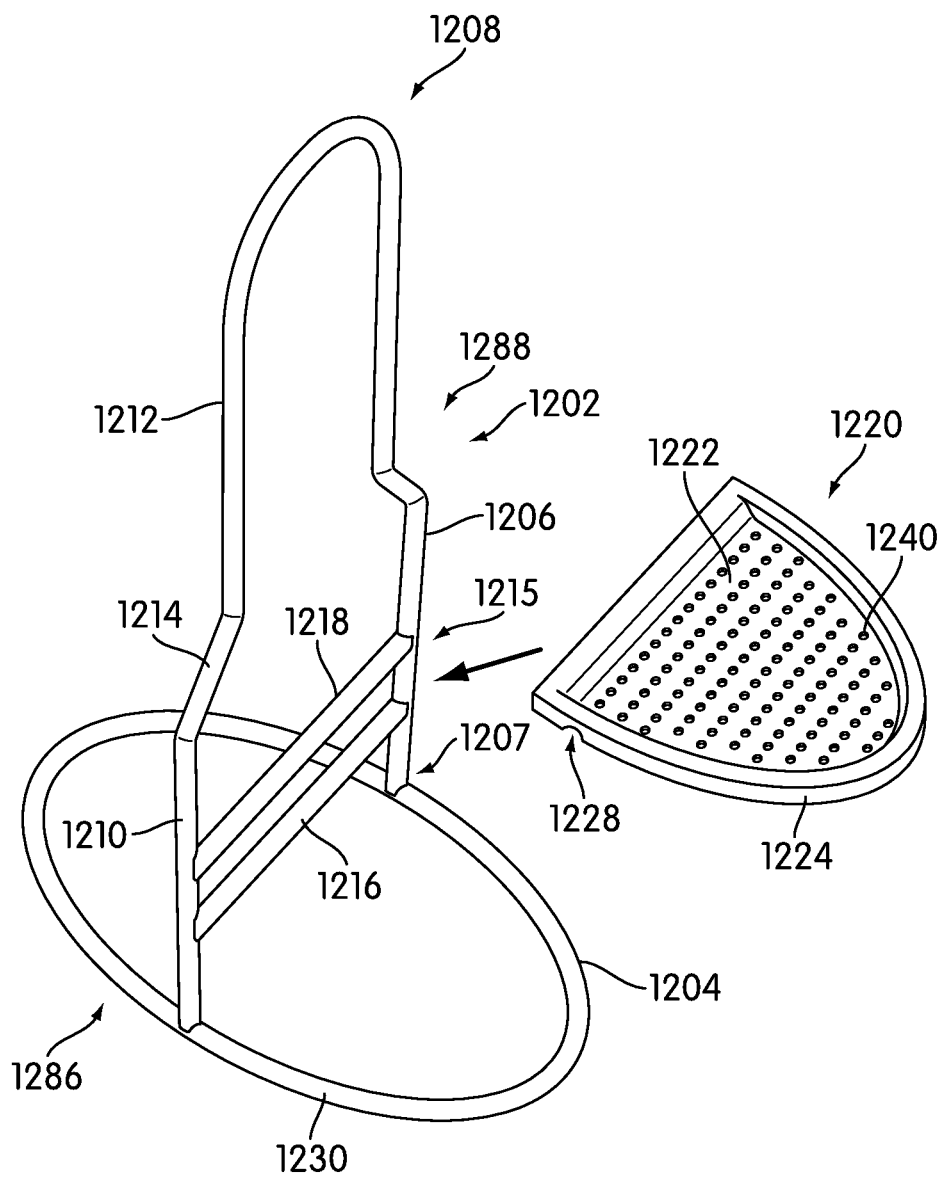
FIG. 13 is an isometric view of an embodiment of a stand for a footwear customization system including a detachable portion that has been removed.
Figure 14:
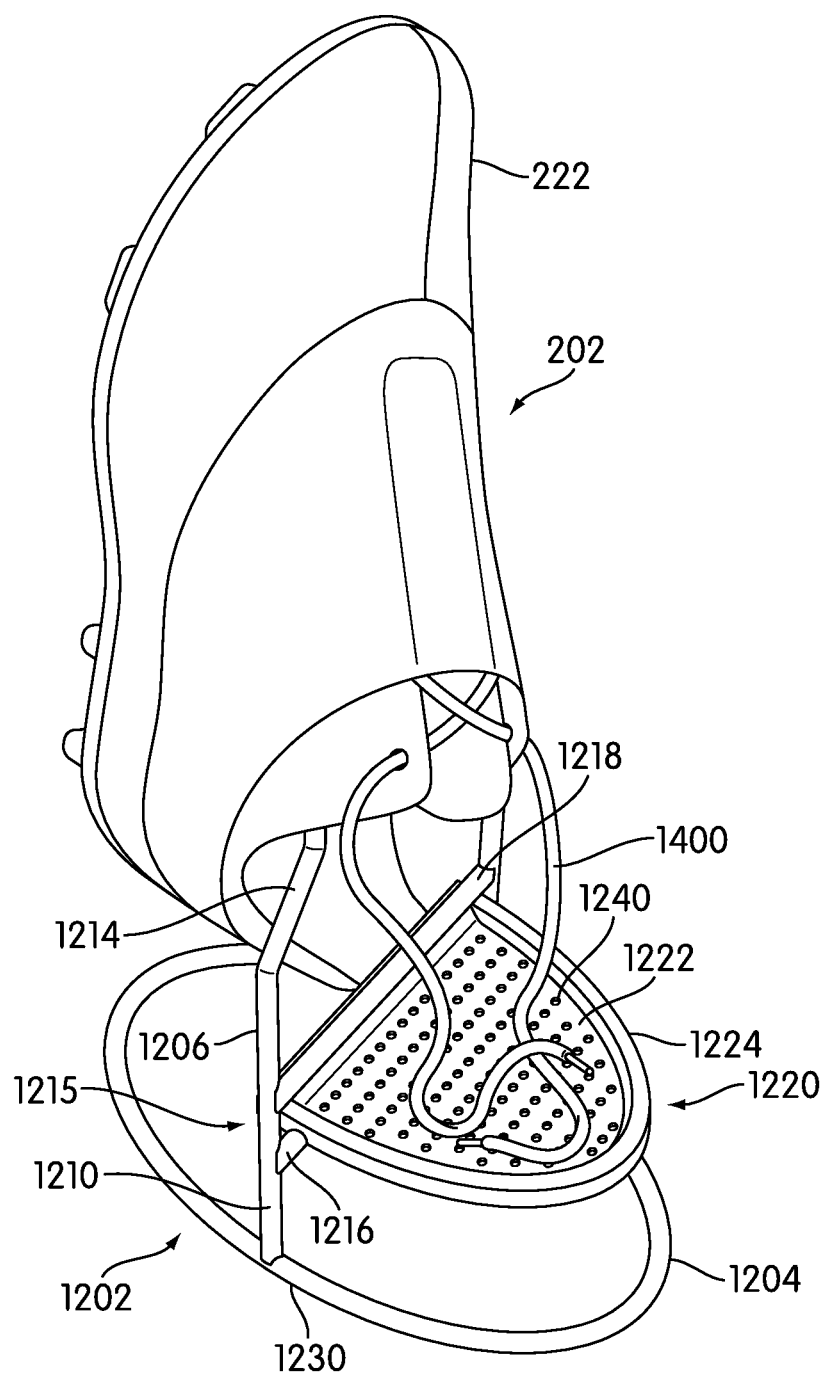
FIG. 14 is an isometric view of an embodiment of a stand for a footwear customization system including a detachable portion that has been placed at an intermediate portion.

FIGS. 12 through 16 illustrate alternative embodiments of stands that may be used with a footwear customization kit. It will be understood that the examples of stands given here are not intended to be limiting and in other embodiments still other kinds of stands can be used with a footwear customization kit. Referring now to FIGS. 12 through 14, a customization kit may be provided with stand 1202. Stand 1202 can include base portion 1204 and footwear engaging portion 1206. Base portion 1204 may be configured to engage a portion of a steaming device that is used for creating a steam environment. For example, in embodiments where the steaming device is a pot, base portion 1204 may engage a bottom interior surface of the pot. In some cases, footwear engaging portion 1206 may extend at an angle from base portion 1204. In one embodiment, footwear engaging portion 1206 may extend generally perpendicularly from base portion 1204. Footwear engaging portion 1206 may include first end portion 1207 that is disposed adjacent to base portion 1204 and second end portion 1208 that is disposed furthest from base portion 1204.

In different embodiments, the shape of base portion 1204 and/or footwear engaging portion 1206 may vary. In some cases, base portion 1204 may have an approximately two dimensional shape. Examples of different shapes for base portion 1204 include, but are not limited to, rounded shapes, rectangular shapes, polygonal shapes, regular shapes, irregular shapes as well as any other kind of shapes. In the current embodiment, base portion 1204 may have an approximately oval-like or elliptic shape. In addition, footwear engaging portion 1206 may have an approximately two dimensional shape that extends from base portion 1204 in a perpendicular manner. Examples of different shapes for footwear engaging portion 1206 include, but are not limited to any of the shapes discussed above for base portion 1204. In an exemplary embodiment, footwear engaging portion 1206 may have an irregular shape.

In some cases, footwear engaging portion 1206 can comprise distinct portions that are associated with different portions of an article of footwear. In some embodiments, footwear engaging portion 1206 may include lower portion 1210 and upper portion 1212. Lower portion 1210 may be disposed adjacent to base portion 1204. In some cases, lower portion 1210 may have a substantially larger width than upper portion 1212. In particular, upper portion 1212 may be narrow enough to insert into a throat opening of an article. In contrast, lower portion 1210 may be substantially wider than upper portion 1212. In particular, lower portion 1210 may be wider than the throat opening of an upper. In some cases, footwear engaging portion 1206 can also include shoulder portion 1214 that extends between lower portion 1210 and upper portion 1212. In one embodiment, the width of shoulder portion 1214 may vary between lower portion 1210 and upper portion 1212. With this arrangement, the throat opening of an article may rest against shoulder portion 1214 to help hold an article in place and in a generally upright position.

In some embodiments, footwear engaging portion 1206 may further comprise intermediate portion 1215 that is disposed between first end portion 1207 and second end portion 1208. In some cases, intermediate portion 1215 may be disposed within lower portion 1210. In other cases, intermediate portion 1215 could be disposed within upper portion 1212. In an exemplary embodiment, intermediate portion 1215 may be disposed within lower portion 1210.

Intermediate portion 1215 may comprise first cross bar 1216 and second cross bar 1218. First cross bar 1216 may extend across lower portion 1210 in a generally widthwise direction. In other words, first cross bar 1216 may extend from lateral side 1286 to medial side 1288 of stand 1202. Similarly, second cross bar 1218 may extend from lateral side 1286 to medial side 1288 of lower portion 1210. In some cases, first cross bar 1216 and second cross bar 1218 can comprise substantially rounded cross sectional shapes. In other cases, however, first cross bar 1216 and second cross bar 1218 may have any other kinds of cross sectional shapes.

In some embodiments, first cross bar 1216 and second cross bar 1218 may provide enhanced strength for stand 1202. In addition, in some cases, first cross bar 1216 and second cross bar 1218 may provide means for attaching a detachable portion to stand 1202, as discussed in further detail below.

In some embodiments, a stand can include provisions for protecting the laces of an article. In some cases, a stand can include features to prevent the laces of an article from hanging down below the heel portion of the article. For example, in embodiments where an article may be placed within a pot of boiling water, a stand can include provisions for preventing the laces from contacting the boiling water directly. In one embodiment, a stand can include a detachable portion that can be used to secure the laces above the boiling water.

In the current embodiment, stand 1202 may include detachable portion 1220. Detachable portion 1220 may include lace receiving portion 1222 and peripheral portion 1224. Peripheral portion 1224 may extend around lace receiving portion 1222.

In some cases, lace receiving portion 1222 may include plurality of holes 1240 that allow steam to pass through detachable portion 1220. However, it will be understood that in other embodiments other provisions could be used including slots, meshes or any other provisions that allow steam to pass through portions of detachable portion 1220. Moreover, in other embodiments detachable portion 1220 may not include any holes, slots or meshes.

Generally, the geometry of detachable portion 1220 can vary. Examples of different shapes for detachable portion 1220 include, but are not limited to, rounded shapes, rectangular shapes, polygonal shapes, regular shapes, irregular shapes as well as any other kind of shapes. In some cases, detachable portion 1220 could have an approximately half oval or half elliptic shape that is associated with the shape of base portion 1204.

In some embodiments, detachable portion 1220 can be configured to attach to stand 1202 at various locations. In order to facilitate placing stand 1202 within a container, detachable portion 1220 may initially be attached to base portion 1204. This arrangement corresponds to a first position of stand 1202 that is illustrated in FIG. 12. In this case, peripheral portion 1224 may be configured to engage outer frame portion 1230 of base portion 1204. In an exemplary embodiment, peripheral portion 1224 may be configured to snap into place within outer frame portion 1230. In other embodiments, however, detachable portion 1220 may be configured to attach to base portion 1204 in any other manner. In another embodiment, detachable portion 1220 may be removably attached to base portion 1204 using a clip. With this arrangement, stand 1202 can easily be placed between two adjacent articles of footwear in a container in a similar manner to the arrangement discussed for stand 302 in the previous embodiment.

In order to help protect the laces of an article while the article is placed in a steam environment, detachable portion 1220 can be removed from base portion 1204, as illustrated in FIG. 13. In cases where peripheral portion 1224 snaps into outer frame portion 1230, detachable portion 1220 can be removed by applying pressure to lace receiving portion. Once detachable portion 1220 is detached from base portion 1204, detachable portion 1220 may be reattached to stand 1202 at intermediate portion 1215. This configuration corresponds to a second position of stand 1202 that is illustrated in FIG. 14. In this case, detachable portion 1220 may be attached to stand 1202 between first cross bar 1216 and second cross bar 1218 of intermediate portion 1215. In some cases, detachable portion 1220 could include recessed portions 1228 for engaging with first cross bar 1216 (see FIG. 13). In an exemplary embodiment, detachable portion 1220 may connect to intermediate portion 1215 in a manner so that detachable portion 1220 extends generally perpendicularly from footwear engaging portion 1206. In particular, in some cases, detachable portion 1220 may be substantially parallel to base portion 1204.

As seen in FIG. 14, article 202 has been placed onto stand 1202. In this case, laces 1400 of article 202 may hang down from upper 222. Using the arrangement discussed here, detachable portion 1220 helps to protect laces 1400. Laces 1400 may be gathered on lace receiving portion 1222. This arrangement may prevent laces 1400 from contacting boiling water. In addition, plurality of holes 1240 help steam to pass through lace receiving portion 1222 and onto article 202.

Figure 15:
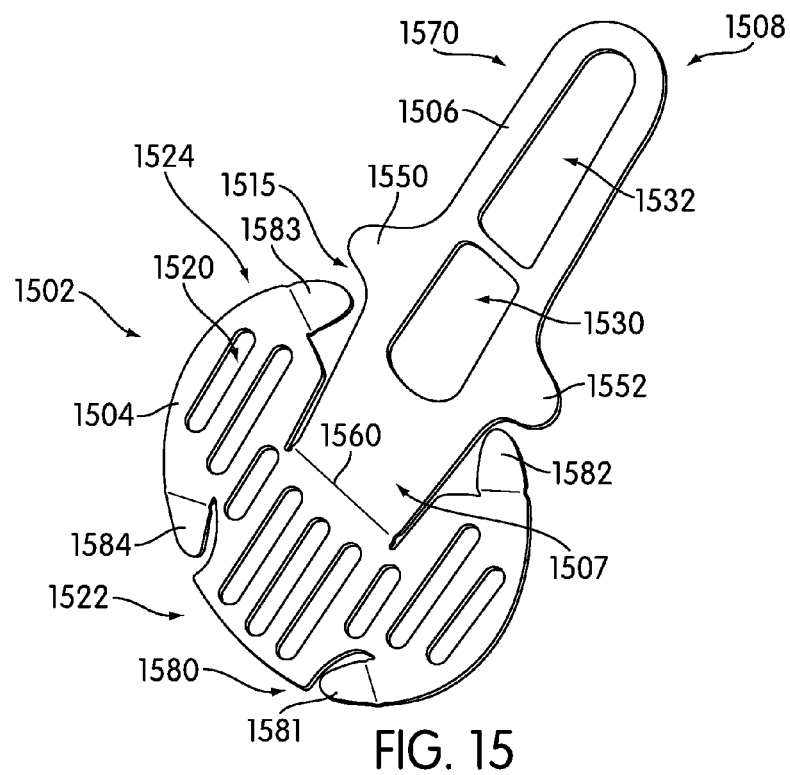
FIG. 15 is an isometric view of an embodiment of a stand for a footwear customization system in a folded position.
Figure 16:
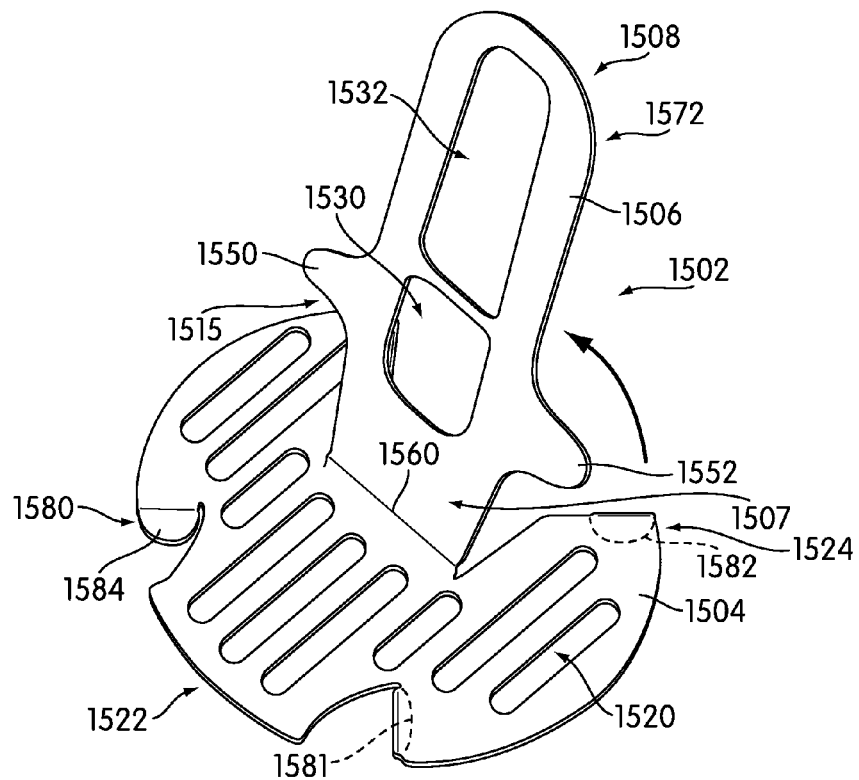
FIG. 16 is an isometric view of an embodiment of a stand for a footwear customization system in a raised position.

FIGS. 15 and 16 illustrate another embodiment of a stand for a footwear customization kit. Referring to FIGS. 15 and 16, a footwear customization kit can be provided with stand 1502. Stand 1502 can include base portion 1504 and footwear engaging portion 1506. Base portion 1504 may be configured to engage a portion of a steaming device that is used for creating a steam environment. For example, in embodiments where the steaming device is a pot, base portion 1504 may engage a bottom interior surface of the pot. In some embodiments, footwear engaging portion 1506 may extend at an angle from base portion 1504. In some cases, footwear engaging portion 1506 may extend generally perpendicularly from base portion 1504. In some cases, footwear engaging portion 1506 may include first end portion 1507 that is disposed adjacent to base portion 1504 and second end portion 1508 that is disposed furthest from base portion 1504.

In different embodiments, the shape of base portion 1504 and/or footwear engaging portion 1506 may vary. In some cases, base portion 1504 may have an approximately two dimensional shape. Examples of different shapes for base portion 1504 include, but are not limited to, rounded shapes, rectangular shapes, polygonal shapes, regular shapes, irregular shapes as well as any other kind of shapes. In the current embodiment, base portion 1504 may have an approximately circular shape. In addition, footwear engaging portion 1506 may have an approximately two dimensional shape that extends from base portion 1504 in a perpendicular manner. Examples of different shapes for footwear engaging portion 1506 include, but are not limited to any of the shapes discussed above for base portion 1504. In an exemplary embodiment, footwear engaging portion 1504 may have an irregular shape.

A base portion and/or a footwear engaging portion can include provisions for reducing the weight of a stand. In some embodiments, base portion 1504 may comprise one or more slots. In the exemplary embodiment, base portion 1504 may include plurality of slots 1520. Plurality of slots 1520 comprise generally parallel slots extending from forward portion 1522 to rearward portion 1524 of base portion 1504. In some cases, plurality of slots 1520 may help to decrease the weight of stand 1502. Additionally, in some cases where base portion 1504 may be raised above the surface of water in a pot, plurality of slots 1520 may also allow steam to pass through base portion 1504 to contact an article of footwear.

Footwear engaging portion 1506 can comprise one or more gaps. In the exemplary embodiment, footwear engaging portion 1506 may include first gap 1530 and second gap 1532. Second gap 1532 may be associated with second end portion 1508. First gap 1530 may be disposed within intermediate portion 1515, which is disposed between first end portion 1507 and second end portion 1508. In some cases, first gap 1530 and second gap 1532 can help reduce the weight of stand 1502. Additionally, in some cases, first gap 1530 and second gap 1532 may allow steam to pass through footwear engaging portion 1506.

Footwear engaging portion 1506 can include provisions for holding an article of footwear. In some embodiments, footwear engaging portion 1506 can include first flange portion 1550 and second flange portion 1552 at intermediate portion 1515. First flange portion 1550 and second flange portion 1552 may generally extend outwardly in a widthwise direction from footwear engaging portion 1506. In particular, first flange portion 1550 and second flange portion 1552 may provide an increased width for intermediate portion 1515 over first end portion 1507 and second end portion 1508. In some cases, intermediate portion 1515 may have a substantially larger width than second end portion 1508. In particular, second end portion 1508 may be narrow enough to insert into a throat opening of an article. In contrast, intermediate portion 1515 may be substantially wider than second end portion 1508. In particular, intermediate portion 1515 may be wider than the throat opening of an upper. With this arrangement, the throat opening of an article may generally rest against first flange portion 1550 and second flange portion 1552 of footwear engaging portion 1506 in order to hold the article in a generally upright position.

A stand can include provisions for reducing the amount of space required to fit the stand in a container associated with a footwear customization kit. In some embodiments, a stand can be provided with detachable portions. In other embodiments, a stand can be configured to fold.

In one embodiment, first end portion 1507 of footwear engaging portion 1506 may be attached to base portion 1504. In some cases, first end portion 1507 may be connected to base portion 1504 using a hinge-like arrangement. In some embodiments, first end portion 1507 may join base portion 1504 at folding crease 1560. Folding crease 1560 may be a region of connection that provides for bending between base portion 1504 and footwear engaging portion 1506. In some cases, folding crease 1560 may be a substantially continuous region of connection. In other cases, folding crease 1560 may comprise gaps or spacing between portions of first end portion 1507 and base portion 1504. In still other cases, folding crease 1560 can have any other configuration that allows for bending between footwear engaging portion 1506 and base portion 1504.

Although the current embodiment illustrates a folding crease between first end portion 1507 and base portion 1504, in other embodiments any other arrangement that provides bending between first end portion 1507 and base portion 1504 can be used. In other cases, for example, first end portion 1507 and base portion 1504 could be joined together using a mechanical hinge of some kind.

The arrangement discussed allows footwear engaging portion 1506 to be configured in various positions with respect to base portion 1504. In some cases, footwear engaging portion 1506 can be moved between a first position 1570 (seen in FIG. 15) and a second position 1572 (seen in FIG. 16). In first position 1570, footwear engaging portion 1506 is disposed in a generally parallel manner with base portion 1504. Furthermore, with footwear engaging portion 1506 in first position 1570, stand 1502 has a substantially flattened configuration. As footwear engaging portion 1506 is folded upwards to second position 1572, footwear engaging portion 1506 may be disposed at an angle to base portion 1504. In some cases, in this second position, footwear engaging portion 1506 may be approximately perpendicular to base portion 1504. In this second position, footwear engaging portion 1506 may be configured to hold an article of footwear in a steam environment. This arrangement allows stand 1502 to be packed in a flattened configured within a container and then folded into a raised position for use with an article.

In some embodiments, stand 1502 can include provisions for increasing the height of base portion 1504. In the current embodiment, base portion 1504 can be provided with one or more folding tab portions. In this case, base portion 1504 includes first folding tab portion 1581, second folding tab portion 1582, third folding tab portion 1583 and fourth folding tab portion 1584 that may be collectively referred to as folding tab set 1580. Each folding tab of folding tab set 1580 may be configured to fold outwardly from base portion 1504 in the manner illustrated in FIGS. 15 and 16. In some cases, each folding tab of folding tab set 1580 may fold to a substantially perpendicular position with respect to base portion 1504 in order to increase the height of base portion 1504.

In different embodiments, stands can be made of different materials. Examples of different materials that could be used include, but are not limited to: metallic materials, polymer materials including plastics and/or rubbers, wooden materials, composite materials, as well as any other kinds of materials. In some cases, the material used for a stand can be selected according to various features of the stand. For example, in embodiments where a stand comprises a monolithic frame-like stand, a metallic material such as aluminum, steel, iron or any other kind of metallic material could be used. In other cases, however, a monolithic frame-like stand could be made of any other kind of material. In embodiments where a stand includes a detachable portion, a plastic material may be used since plastic pieces can be designed for detachable assembly. In other cases, however, stands using detachable portions could be made of any other kind of material. In embodiments where a stand comprises one or more folding portions, a deformable sheet material could be used, such as a deformable plastic sheet material or a deformable metallic sheet material. In other cases, however, stands including folding portions could be made of any other kind of material.

An article of footwear can be provided with two or more distinct materials that can be deformed when heated above a predetermined temperature and then retain differing rigidities when cooled below the predetermined temperature. For example, in one embodiment, an upper may comprise a first material that is customizable and an insert may comprise a second material that is customizable. Moreover, the second material may be substantially more rigid than the first material after both materials are heated above a predetermined temperature and then cooled again. In another embodiment, an upper may comprise a first material that is customizable and a sole structure may comprise a second material that is customizable. Moreover, the first material and the second material may have substantially different rigidities after both materials are heated above a predetermined temperature and then cooled again. Still further, in other embodiments, three or more customizable materials could be used for different portions of an article of footwear.

Figure 17:
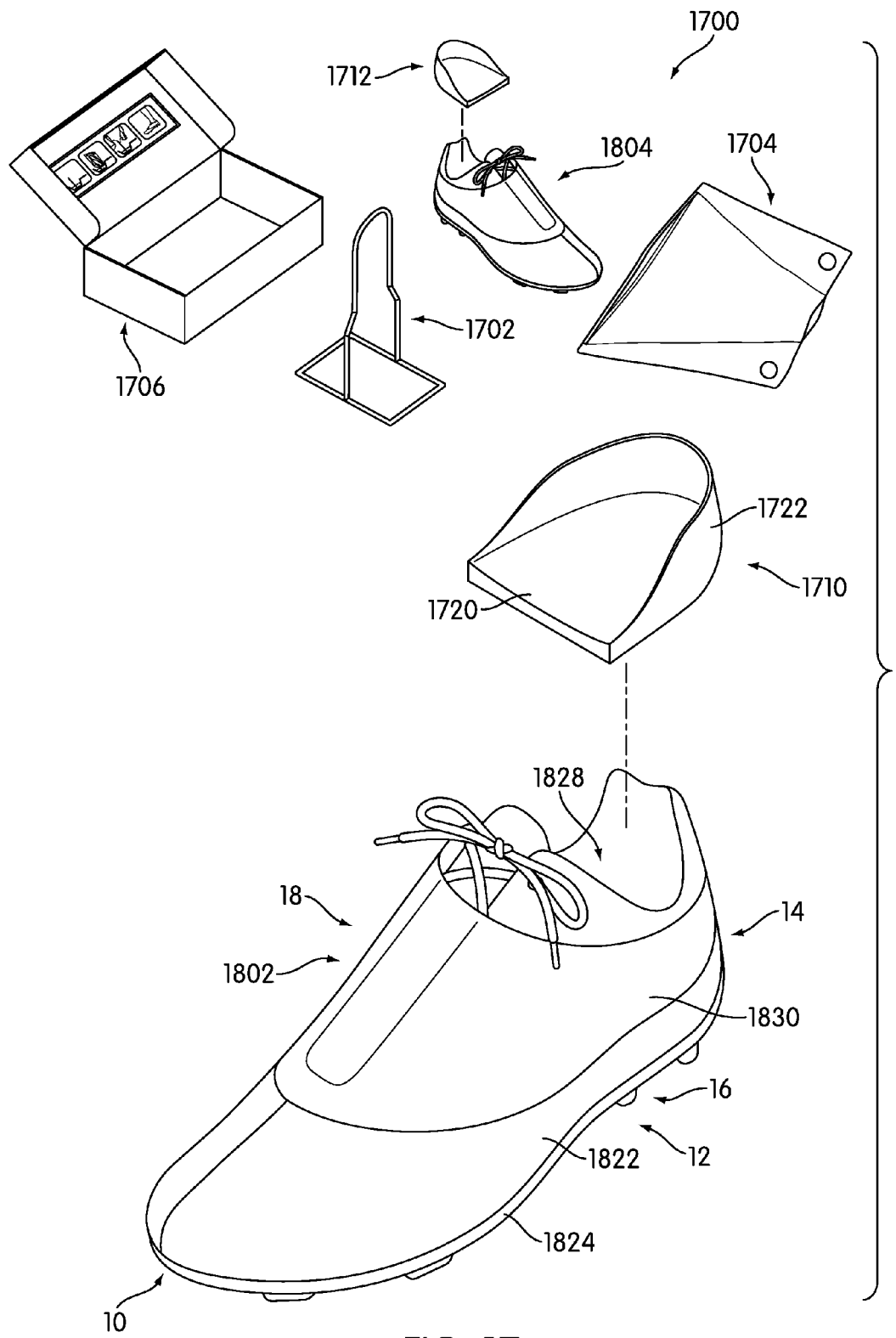
FIG. 17 is an isometric view of an embodiment of an article of footwear including a customizable portion and a customizable insert.
Figure 18:
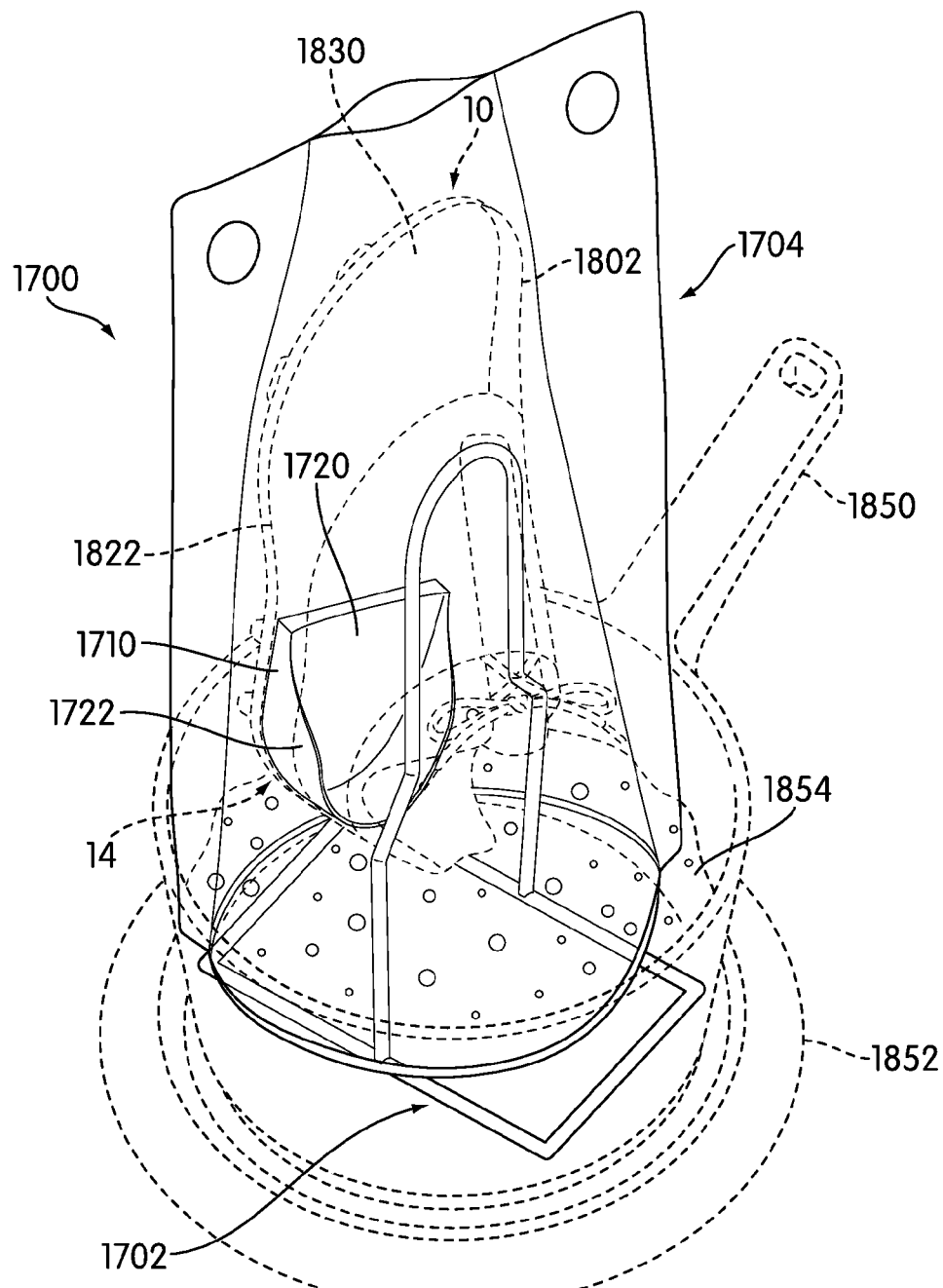
FIG. 18 is an isometric view of an embodiment of an article of footwear including a customizable portion and a customizable insert being heated in a steam environment.

FIGS. 17 through 21 illustrate another embodiment of a customization system for customizing an article of footwear. Referring to FIGS. 17 and 18, customization kit 1700 includes first article of footwear 1802, second article of footwear 1804, stand 1702 and steaming bag 1704. Kit 1700 further includes container 1706 for storing each of these components. These components are substantially similar to the components discussed in the previous embodiments. Kit 1700 may also include a set of optional customizable inserts. In this case, kit 1700 includes first customizable insert 1710 and second customizable insert 1712. First customizable insert 1710 and second customizable insert 1712 may be used with first article of footwear 1802 and second article of footwear 1804, respectively.

Although the current embodiment illustrates removable inserts, in other cases other types of inserts could be used. For example, in another embodiment, an insert could be embedded or integrally formed with an article of footwear. In one embodiment, an insert could be integrally formed with an interior portion of an upper. In another embodiment, an insert could be integrally formed with an interior surface of a sole structure. In still other embodiments, an insert could be embedded or integrally formed with any other component of an article of footwear.

For purposes of clarity, only first customizable insert 1710 is discussed in detail, however it should be understood that the same principles may apply to second customizable insert 1712 that is configured to be used with second article of footwear 1804. Furthermore, throughout the remainder of this detailed description first article of footwear 1802 and first customizable insert 1710 may be referred to as article 1802 and customizable insert 1710, respectively.

Article 1802 may be substantially similar to article 202 discussed in the previous embodiments. Article 1802 may comprise upper 1822 and sole structure 1824. For purposes of locating different features of article 1802, article 1802 may be associated with forefoot portion 10, midfoot portion 12 and heel portion 14 as well as with lateral side 16 and medial side 18.

In some embodiments, upper 1822 may be associated with one or more customizable portions. In some cases, a customizable portion may be associated with forefoot portion 10, midfoot portion 12 and/or heel portion 14 of upper 1822. In other cases, a customizable portion may be associated with any combination of different portions of upper 1822. In an exemplary embodiment, upper 1822 may include customizable portion 1830. In particular, customizable portion 1830 may extend through a substantial majority of upper 1822. In some cases, customizable portion 1830 may coincide with upper 1822.

The characteristics of customizable portions can be varied in different ways. In some embodiments, a customizable portion can be varied through a curing process. In other words, the customizable portion may be heated above a predetermined temperature and modified before cooling the customizable portion so that the modifications are retained. In other embodiments, the characteristics of customizable portions can be varied through the use of pressure, chemical additives or other known methods of changing the characteristics of material including the size, shape, rigidity, flexibility and/or other properties. In still other embodiments, a combination of heat, pressure and/or chemicals could be used to modify the customizable portion.

In order to modify customizable portion 1830, article 1802 may be heated above a predetermined temperature. In some cases, article 1802 may be placed in an oven. In other cases, article 1802 may be heated using steam. In an exemplary embodiment, article 1802 may be heated in any steam environment. A steam environment can be created in different ways. In some cases, a steam environment can be created using a pot with water that may be boiled to create steam. In other cases, any other devices or mechanisms for creating steam can be used.

In different embodiments, customizable insert 1710 can be associated with different portions of article 1802. In some cases, customizable insert 1710 may be associated with forefoot portion 10. In other cases, customizable insert 1710 may be associated with midfoot portion 12. In still other cases, customizable insert 1710 may be associated with heel portion 14. In an exemplary embodiment, customizable insert 1710 may be configured as a heel insert that is associated with heel portion 14 of article 1802. In some cases, customizable insert 1710 may be removably inserted from article 1802 through throat opening 1828.

Customizable insert 1710 may comprise base portion 1720 and sidewall portion 1722. Sidewall portion 1722 may be disposed at an angle with respect to base portion 1720. In some cases, sidewall portion 1722 may be configured to contact the sides and rear of a heel. Likewise, base portion 1720 may be configured to receive the bottom surface of a heel.

In some embodiments, customizable insert 1710 may be customized using heat. In some cases, the shape of customizable insert 1710 may be changed by raising the temperature of customizable insert 1710 above a predetermined temperature. In one embodiment, the shape of customizable insert 1710 may be changed by applying steam to customizable insert 1710.

In some embodiments, the material properties of customizable portion 1830 and customizable insert 1710 may vary. In some cases, customizable portion 1830 and customizable insert 1710 may be made of substantially similar materials. In other cases, customizable portion 1830 and customizable insert 1710 may be made of substantially different materials. In an exemplary embodiment, customizable portion 1830 and customizable insert 1710 may be made of substantially different materials.

As previously discussed, customizable portions can be made from any known materials or combination of materials. Examples of materials that may be used include, but are not limited to: any kind of thermoplastics, thermoset polymers, thermoset resins (such as epoxy, vinlyester and polyster), synthetic leathers including poromeric leathers and lorica, as well as any other kinds of materials with customizable characteristics. In an exemplary embodiment, a customizable portion may be constructed as a synthetic leather comprising two polymer layers that sandwich a canvas sheet. Moreover, a glue used to bond the polymer layers to the canvas may be configured with a relatively low melting point. When steamed, this glue can stretch or shrink to accommodate a customized shape. Although the current embodiment discusses a three-layered construction, other customizable portions could incorporate any other number of layers including a single layer construction.

Customizable inserts can be made of any known materials or combinations of materials. Examples of materials that may be used for a customizable insert include, but are not limited to: any kind of thermoset polymers, thermoset resins (such as epoxy, vinylester and polyester), synthetic leathers, as well as any other materials with customizable characteristics. In some embodiments, a customizable insert can be made from a thermoset foam. In one embodiment, a customizable insert can be made of a modified ethyl-vinyl-acetate (EVA) material that has thermoset properties.

In some embodiments, materials for a customizable portion of an article and a customizable insert can be selected according to material characteristics such as durability, rigidity and/or flexibility. In an exemplary embodiment, materials for a customizable portion that is used with an upper and a customizable insert may be selected so that the customizable portion is substantially less rigid than the customizable insert after curing. This arrangement may allow for a greater degree of flexibility for the customizable portion as the foot moves. In contrast, the customizable insert may be relatively rigid after curing to ensure good support for a heel during use.

Referring now to FIG. 18, the components of kit 1700 may be assembled within a steam environment in order to customize article 1802. In the current embodiment, pot 1850 and burner 1852 are used to boil water 1854 for creating steam. Furthermore, article 1802 has been placed on stand 1702 within pot 1850. Steaming bag 1704 has been placed over stand 1702 and article 1802 to capture the steam. With this arrangement, both customizable portion 1830 of upper 1822 and customizable insert 1710 may be heated above the predetermined temperature.

In this exemplary embodiment, article 1802 is held in a substantially vertical position. In other words, heel portion 14 is substantially closed to water 1854 than forefoot portion 10. In some cases, this arrangement can help ensure that customizable insert 1710 is heated above the predetermined temperature.

Figure 19:
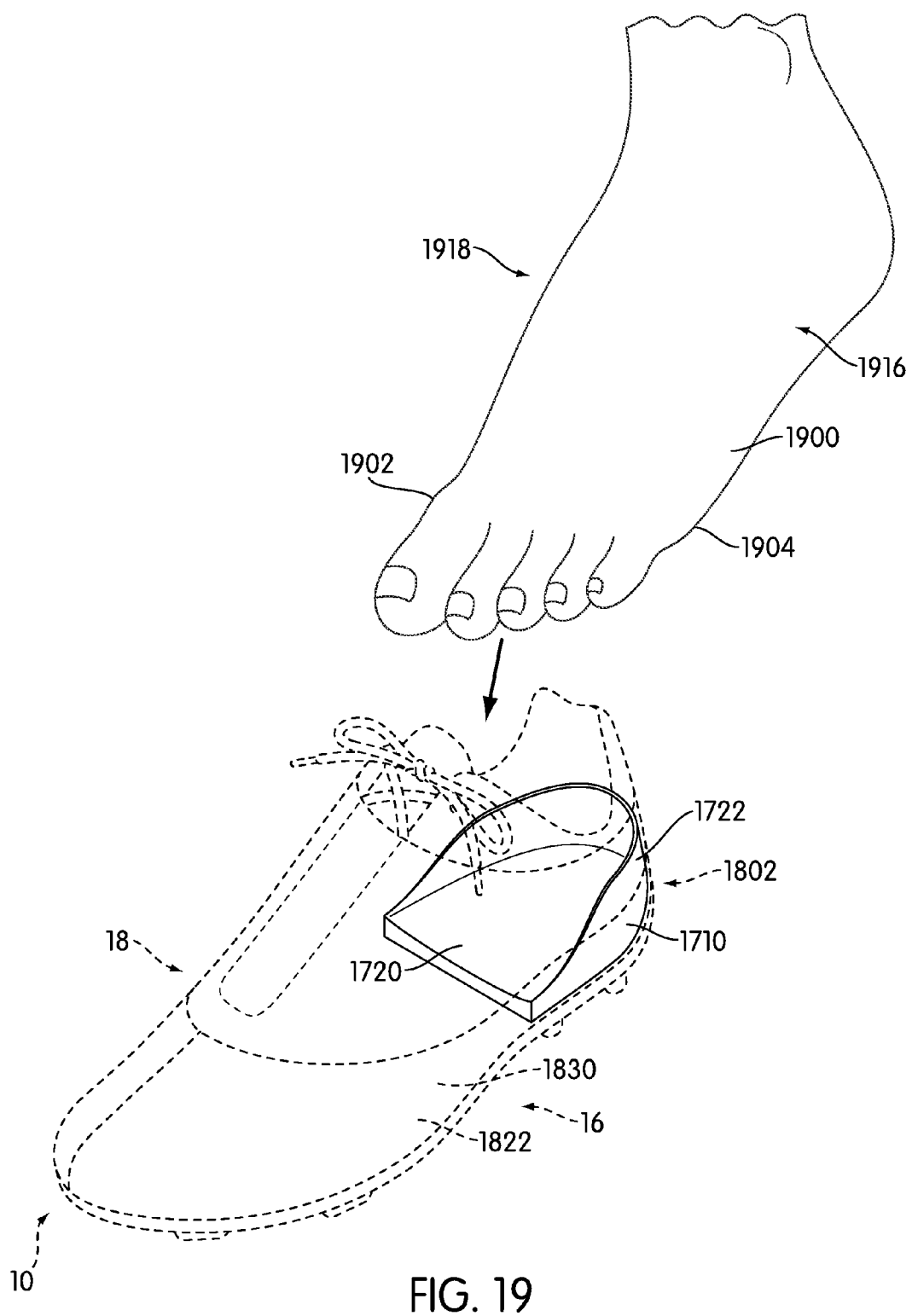
FIG. 19 is an isometric view of an embodiment of an article of footwear including a customizable portion and a customizable insert in a heated condition prior to a foot being inserted.
Figure 20:
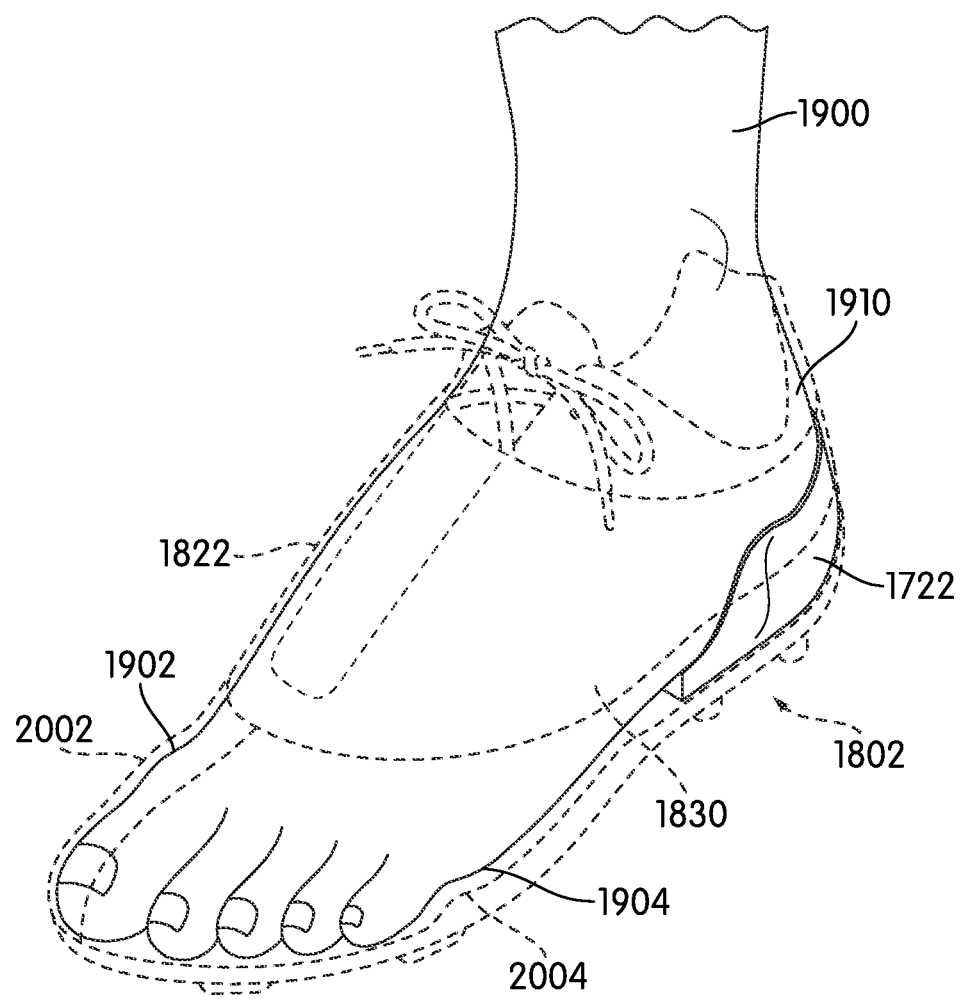
FIG. 20 is an isometric view of an embodiment of an article of footwear including a customizable portion and a customizable insert in a heated condition as a foot has been inserted.
Figure 21:
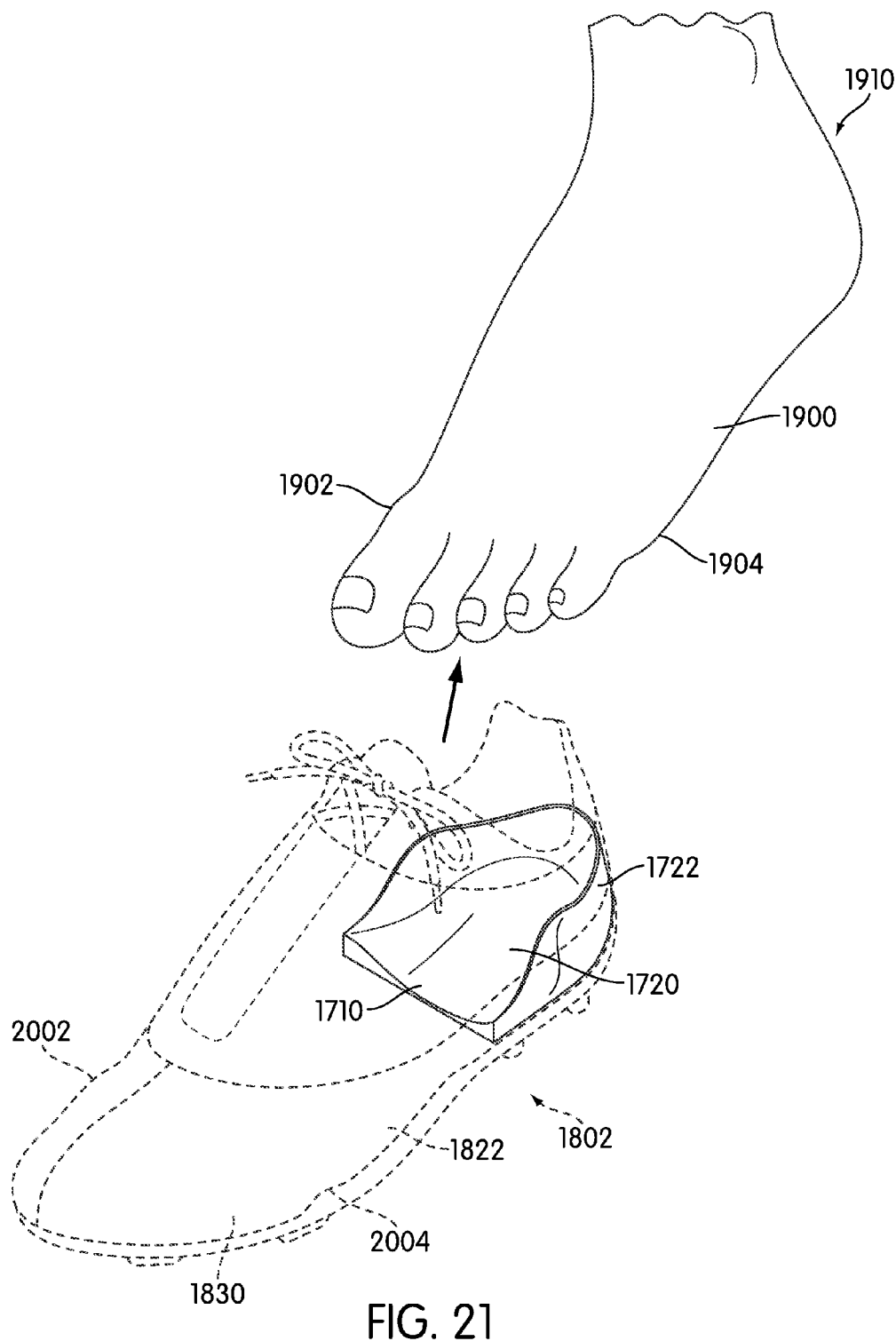
FIG. 21 is an isometric view of an embodiment of an article of footwear including a customizable portion and a customizable insert in a cooled condition after a foot has been removed.

FIGS. 19 through 21 illustrate isometric views of an embodiment of a customizable portion of an article and a customizable insert simultaneously conforming to the shape of a foot. As previously discussed, the current embodiment includes customizable portion 1830 that comprises a substantial majority of upper 1822 of article 1802. Therefore, as a foot is inserted into upper 1822, a substantial majority of upper 1822 may conform to the shape of the foot. Additionally, article 1802 includes customizable insert 1710 that can be customized to the shape of a heel.

Referring to FIG. 19, the temperature of article 1802 may be above the predetermined temperature at which customizable portion 1830 softens substantially. In this heated state, customizable portion 1830 may be partially deformable. Initially, customizable portion 1830 has a substantially smooth shape. In particular, forefoot portion 10 is generally smooth on both lateral side 16 and medial side 18 of upper 1822.

Foot 1900 is illustrated as inserting into article 1802. In contrast to the substantially smooth shape of customizable portion 1830, foot 1900 has a substantially irregular shape. In this case, foot 1900 includes first protrusion 1902 and second protrusion 1904 associated with medial side 1918 and lateral side 1916, respectively, of foot 1900. These protrusions could be associated with any type of irregularities in the shape of foot 1900 including any kinds of bony protrusions, calluses or other types of protrusions.

The temperature of customizable insert 1710 may also be above the predetermined temperature at which customizable insert 1710 softens substantially. Initially, customizable insert 1710 has a substantially smooth shape. In particular, base portion 1720 has a substantially constant thickness. Also, sidewall portion 1722 has a substantially constant height. It will be understood that in some cases, customizable insert 1710 and customizable portion 1830 may be associated with substantially similar predetermined temperatures or glass transition temperatures. However, in other cases, customizable insert 1710 and customizable portion 1830 may be associated with substantially different predetermined temperatures. In such cases, as long as the steam environment is able to raise the temperature of article 1802 above both predetermined temperatures, customizable insert 1710 and customizable portion 1810 may both be cured during a single process.

Referring now to FIG. 20, foot 1900 has been fully inserted into upper 1822. Furthermore, the temperature of article 1802 is still above the predetermined temperature associated with customizable portion 1830. In this heated state, customizable portion 1830 may be deformed. In an exemplary embodiment, customizable portion 1830 may deform so as to adapt to the shape of foot 1900. Specifically, in this case, customizable portion 1830 may be reshaped due the pressure applied by foot 1900. For example, first contoured portion 2002 of customizable portion 1930 may be formed from the local pressure applied by first protrusion 1902. In other words, first contoured portion 2002 may be configured with a substantially similar geometry to first protrusion 1902. In particular, first contoured portion 2002 may form a protrusion on upper 1822 that corresponds to first protrusion 1902 on foot 900. In a similar manner, second contoured portion 2004 of customizable portion 1830 may be formed from the local pressure applied by second protrusion 1904. In other words, second contoured portion 2004 may be configured with a substantially similar geometry to second protrusion 1904. In particular, second contoured portion 2004 may form a protrusion on upper 1822 that corresponds to second protrusion 1904 on foot 1900.

It should be understood that a customizable portion could adapt to any geometric features of a foot. In some cases, the customizable portion may adapt to protrusions of various kinds. Additionally a customizable portion can adapt to the overall shape and geometry of a foot. For example, in an embodiment where a user has relatively wide arch, a customizable portion comprising a portion of the upper may be configured to expand at the arch to provide a better fit for the user. In other words, a customizable portion can deformed to accommodate global geometric features of a foot in addition to local geometric features such as protrusions.

Also, with foot 1900 fully inserted into upper 1822, customizable insert 1710 may adapt to the shape of foot 1900. In some cases, base portion 1720 may be deformed under the weight of heel 1910 (see FIG. 21). In particular, base portion 1720 may be compressed so that the thickness of base portion 1720 varies in a widthwise direction. Also, sidewall portion 1722 may conform to the shape of the side portions and rear portions of heel 1910. It will be understood that the variations in the geometry of customizable insert 1710 illustrated and discussed in this embodiment are only intended to be exemplary. In other embodiments, any other kinds of deformations are possible. In particular, both global geometric properties and local geometric properties of customizable insert 1710 could be varied.

In order to ensure that customizable portion 1830 and customizable insert 1710 are substantially permanently deformed in a manner that corresponds to foot 1900, it is desirable that article 1802 cool below the predetermined temperature before removing foot 1900. In some cases, a user could make a temperature measurement of article 1802. In other cases, a user may wait a predetermined period of time before removing article 1802 to ensure that article 1802 has sufficiently cooled. In some embodiments, a set of instructions could provide information for a user including a desired amount of time for keeping a foot inserted inside an article of footwear.

After article 1802 has cooled below the predetermined temperature, foot 1900 can be removed from upper 1822, as illustrated in FIG. 21. Customizable portion 1830 may substantially retain the shape corresponding to foot 1900 following the removal of foot 1900. In this case, customizable portion 1830 retains first contoured portion 2002 and second contoured portion 2004 even after foot 1900 as been removed. With this arrangement, upper 1822 may be substantially permanently reshaped to provide a better fit and enhanced comfort for the user. In a similar manner, customizable insert 1710 may also substantially retain the shape corresponding to heel portion 1910 of foot 1900.

Furthermore, after cooling, customizable portion 1830 and customizable insert 1710 may acquire substantially different rigidities. In some cases, customizable portion 1830 may be substantially less rigid that customizable insert 1710. This arrangement allows customizable portion 1830, which comprises a substantial majority of upper 1822, to flex and accommodate movement of a foot during use. In contrast, customizable insert 1710 may be relatively rigid to increase support for a heel.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A stand for holding an article of footwear in a steam environment, comprising:
   a base portion for supporting the stand and a footwear engaging portion;
   the footwear engaging portion having a folded position for storing the stand with the article of footwear and a raised position for holding the article of footwear in the steam environment;
   wherein the footwear engaging portion is substantially angled with respect to the base portion in the raised position and wherein the base portion and the footwear engaging portion have a substantially flattened configuration when the footwear engaging portion is in the folded position; and
   wherein the footwear engaging portion has an approximately two dimensional geometry in the raised position.

2. The stand according to claim 1, wherein the footwear engaging portion is oriented in an approximately perpendicular manner with respect to the base portion in the raised position.

3. The stand according to claim 1, wherein the stand has an approximately two dimensional geometry in the folded position.

4. The stand according to claim 1, wherein the base portion has an approximately two dimensional geometry.

5. The stand according to claim 1, wherein the footwear engaging portion is attached to the base portion along a folding crease disposed approximately in the middle of the base portion.

6. The stand according to claim 1, wherein the base portion includes at least one bending tab portion.

7. The stand according to claim 6, wherein the base portion includes four bending tab portions.

8. The stand according to claim 1, wherein the height of the base portion is configured to be increased using the at least one bending tab portion.

9. The stand according to claim 1, wherein the stand is made from a sheet of material having an approximately two dimensional geometry.

10. The stand according to claim 1, wherein the base portion has an approximately circular shape.

11. The stand according to claim 1, wherein the base portion comprises a plurality of slots.

12. A stand for holding an article of footwear in a steam environment, comprising:
    a base portion for supporting the stand and a footwear engaging portion;
    the footwear engaging portion including a lower portion configured to be attached to the base portion and an upper portion disposed adjacent to the lower portion;
    the footwear engaging portion having a folded position for storing the stand with the article of footwear and a raised position for holding the article of footwear in the steam environment;
    wherein when the footwear engaging portion is configured in the raised position, the lower portion of the footwear engaging portion is attached to the base portion and the upper portion of the footwear engaging portion is disposed away from the base portion; and
    wherein the lower portion of the footwear engaging portion is attached to the base portion along a folding crease disposed approximately in the middle of the base portion.

13. The stand according to claim 12, wherein the upper portion has a first width that is sized and dimensioned so as to be less than a width associated with a throat opening of an article of footwear; and
    wherein the upper portion of the footwear engaging portion is configured to be inserted through the throat opening of an article of footwear.

14. The stand according to claim 13, wherein the lower portion of the footwear engaging portion has a second width that is greater than the first width.

15. The stand according to claim 12, wherein the footwear engaging portion further includes a shoulder portion disposed between the upper portion and the lower portion.

16. The stand according to claim 15, wherein a width of the shoulder portion varies between the lower portion and the upper portion; and
    wherein the width of the shoulder portion is sized and dimensioned such that a throat opening of an article of footwear is configured to rest on the shoulder portion when an article of footwear is mounted on the stand.

17. The stand according to claim 12, wherein the footwear engaging portion has an approximately two dimensional geometry in the raised position.

18. The stand according to claim 12, wherein the stand is made from a sheet of material having an approximately two dimensional geometry.

19. The stand according to claim 12, wherein the base portion of comprises a plurality of slots.

* * * * *